United States Patent
Oz et al.

(10) Patent No.: US 9,508,204 B2
(45) Date of Patent: Nov. 29, 2016

(54) PACKAGE EXCHANGE AND SERVICE SYSTEM USING A KEY FOB SIMULATOR

(71) Applicant: Continental Intelligent Transportation Systems LLC, Santa Clara, CA (US)

(72) Inventors: Seval Oz, San Jose, CA (US); Yao Zhai, Fremont, CA (US); Ritesh Ahuja, Santa Clara, CA (US); Adrian Ramos Aguayo, San Jose, CA (US); Tejas Desai, Troy, MI (US)

(73) Assignee: Continental Intelligent Transportation Systems, LLC, Santa Clara, CA (US)

( * ) Notice: Subject to any disclaimer, the term of this patent is extended or adjusted under 35 U.S.C. 154(b) by 0 days.

(21) Appl. No.: 14/869,645

(22) Filed: Sep. 29, 2015

(65) Prior Publication Data

US 2016/0098871 A1 Apr. 7, 2016

Related U.S. Application Data

(60) Provisional application No. 62/058,410, filed on Oct. 1, 2014, provisional application No. 62/170,593, filed on Jun. 3, 2015.

(51) Int. Cl.
*G07C 9/00* (2006.01)
*G01S 19/42* (2010.01)
(Continued)

(52) U.S. Cl.
CPC ........... *G07C 9/00007* (2013.01); *G01S 19/14* (2013.01); *G01S 19/42* (2013.01);
(Continued)

(58) Field of Classification Search
CPC ........... G07C 2009/00341; G07C 2009/0038; G07C 2009/00547; G07C 9/00007; G07C 9/00309; G07C 9/00031; G07C 2009/00396; G07C 2009/00769; G07C 2009/00928; G07C 2009/00984; G07C 5/008; G07C 5/02; G07C 5/08; G07C 2009/00793; G07C 5/085; G07C 9/00087; G07C 9/00111; G08C 17/02; B60W 50/12

See application file for complete search history.

(56) References Cited

U.S. PATENT DOCUMENTS 5,864,297 A    1/1999   Sollestre et al.
5,926,117 A *  7/1999   Gunji ..................... G01S 19/04
                                                340/988

(Continued)

FOREIGN PATENT DOCUMENTS

EP           1 564 690        8/2005
WO      WO 2013/092306 A2     6/2013

OTHER PUBLICATIONS

International Search Report and Written Opinion for International Patent Application No. PCT/US2015/053331 mailed Dec. 28, 2015, 10 pages, International Searching Authority, Alexandria VA.

(Continued)

*Primary Examiner* — Dionne H Pendleton
(74) *Attorney, Agent, or Firm* — Rutan & Tucker, LLP

(57) ABSTRACT

A key fob simulator for sending actuation command to a vehicle is discussed. The key fob has memory buffers, processors, and a transceiver that uses wireless communications to communicate with a backend cloud-based system. A RF transmitter of the key fob can transmit RF signals to Remote Keyless Entry (RKE) module of the vehicle. A mapping module includes a map-calculating circuit to calculate map coordinates of the key fob. A security module can receive a rolling security key of the RKE module of the vehicle. The key fob includes buttons that can be pushed by a user of the key fob to generate actuation commands by the security module. Using the RF transmitter, an actuation command and the rolling security key can be sent from security module to the RKE module of the vehicle. The RKE module then executes the actuation command after validating the rolling security key.

15 Claims, 25 Drawing Sheets

(51) Int. Cl.
    *G01S 19/14*     (2010.01)
    *G06Q 10/08*     (2012.01)

(52) U.S. Cl.
    CPC ....... *G07C9/00111* (2013.01); *G07C 9/00309* (2013.01); *G06Q 10/083* (2013.01); *G07C 2009/00984* (2013.01); *G07C 2209/64* (2013.01)

(56) References Cited

U.S. PATENT DOCUMENTS

| | | | |
|---|---|---|---|
| 6,073,064 | A | 6/2000 | Konrad et al. |
| 6,529,808 | B1 | 3/2003 | Diem |
| 7,432,796 | B2 | 10/2008 | Kawamura et al. |
| 8,232,897 | B2 | 7/2012 | Tieman et al. |
| 8,643,511 | B1 | 2/2014 | Batterson |
| 9,111,453 | B1 * | 8/2015 | Alselimi ............ G06K 9/00785 |
| 2003/0171860 | A1 | 9/2003 | Fan et al. |
| 2006/0202798 | A1 | 9/2006 | Baumgartner et al. |
| 2008/0021747 | A1 | 1/2008 | Moeller et al. |
| 2009/0160607 | A1 | 6/2009 | Edwards et al. |
| 2010/0321213 | A1 | 12/2010 | Mattila et al. |
| 2011/0032075 | A1 | 2/2011 | Alrabady et al. |
| 2011/0112969 | A1 | 5/2011 | Zaid et al. |
| 2011/0257817 | A1 | 10/2011 | Tieman |
| 2012/0139760 | A1 | 6/2012 | Bevacqua et al. |
| 2013/0131982 | A1 | 5/2013 | Siris |
| 2013/0173147 | A1 | 7/2013 | Takeuchi et al. |
| 2014/0180959 | A1 | 6/2014 | Gillen et al. |
| 2014/0229501 | A1 | 8/2014 | Josefiak |
| 2014/0277837 | A1 | 9/2014 | Hatton |
| 2015/0170444 | A1 * | 6/2015 | Yasui ................ G07C 9/00007 340/5.61 |
| 2015/0215779 | A1 | 7/2015 | Fokkelman et al. |

OTHER PUBLICATIONS

Continental: Open Sesame: Continental with mobile phones are a great cars keys Nov. 13, 2011, (6 pages).

"Cardrops, your car becomes an e-commerce delivery point"; download from Internet Sep. 27, 2015, 5 pages, http://www.cardrops.com Behrmann, Elisabeth; Weiss, Richard, "Volvo Said to Near Deal to Deliver Parcels to Parked Cars" 6 pages. Nov. 17, 2014. Downloaded Dec. 10, 2014 from www.bloomberg.com/news/2014-11-17/volvo-said-to-near-deal . . . .

\* cited by examiner

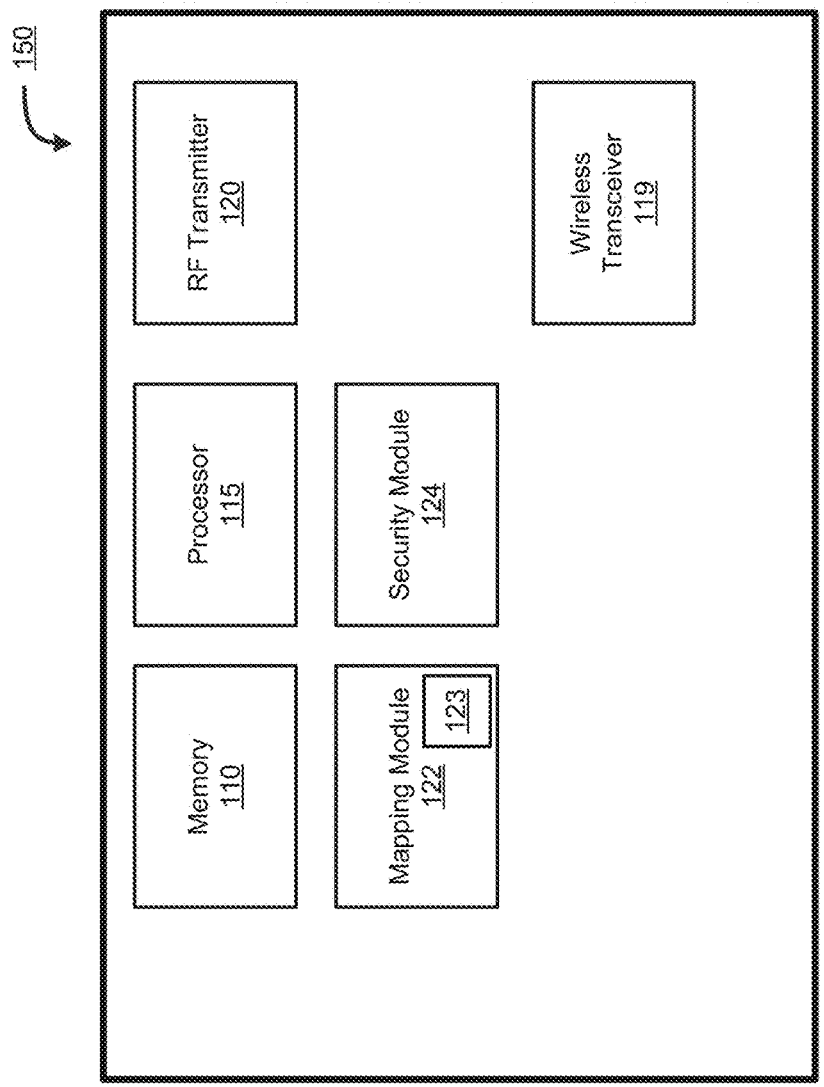

package-transfer-service Architecture

PACKAGE EXCHANGE AND SERVICE SYSTEM USING A KEY FOB SIMULATOR

RELATED APPLICATIONS

This application claims the benefit of U.S. Provisional Patent Application No. 62/058,410, filed Oct. 1, 2014, and entitled "PACKAGE DELIVERY TO AND PICK-UP FROM A VEHICLE", and also claims the benefit of U.S. Provisional Patent Application No. 62/170,593, filed Jun. 3, 2015, and entitled "PACKAGE EXCHANGE AND SERVICE SYSTEM USING A KEY FOB SIMULATOR", both of the provisional applications are incorporated herein by reference.

FIELD

The design generally relates to a package exchange, including a package delivery to a vehicle and/or pick-up from a vehicle, and a vehicle service system using a key fob simulator.

BACKGROUND

Typically, shipments are usually sent to the home address of the person concerned. This technology instead delivers packages to or picks-up a package from inside a customer's mobile location such as a vehicle while ensuring safe delivery at the exchange location. On site vehicle maintenance can also use a key fob simulator.

SUMMARY

In general, a universal key fob simulator for sending actuation commands to a target vehicle is described. The universal key fob simulator has one or more memory buffers, one or more processors, a transceiver that can use wireless communications to communicate with a backend cloud-based system, and a Radio Frequency (RF) transmitter that can transmit RF signals of a command to a Remote Keyless Entry (RKE) module of the target vehicle. The Radio Frequency transmitter has one or more Application Specific Integrated Circuits to be highly configurable in generating this set of two or more stable RF signals at different frequency wavelengths, which can then transmit the appropriate RF signals to command a Remote Keyless Entry (RKE) module of two or more different vehicles in the market. The universal key fob simulator also includes a mapping module that has a map-calculating circuit. The map-calculating circuit can receive map locating signals to calculate map coordinates of a delivery vehicle associated with the universal key fob simulator. The mapping module can store the map coordinates of the delivery vehicle in the buffers of the universal key fob simulator. The mapping module can also send map coordinates of the delivery vehicle, via the transceiver, to servers of the backend cloud-based system. The backend cloud-based system can use the map coordinates of the delivery vehicle to monitor the location of the delivery vehicle. The universal key fob simulator further has a security module that can receive, via the transceiver, a rolling security key of the RKE module of the target vehicle from the servers of the backend cloud-based system. The security module can receive the rolling security key of the RKE module of the target vehicle after the delivery vehicle reaches a pre-determined location. The universal key fob simulator further has one or more buttons that can be pushed by a user of the universal key fob simulator. The buttons of the universal key fob simulator can to be activated after receiving at least one rolling security key of the RKE module of the target vehicle from the servers of the backend cloud-based system. In response to pushing a button of the universal key fob simulator, the security module can generate a first actuation command. The security module can send the first actuation command and the rolling security key of the target vehicle to the RKE module of the target vehicle. The first actuation command and the rolling security key are sent through commanding the RF transmitter to transmit RF signals including the first actuation command and the rolling security key to the RKE module of the target vehicle. After validating the rolling security key, the RKE module of the target vehicle can then execute the first actuation command for an electro mechanical operation in the target vehicle.

In an embodiment, a method of accessing a target vehicle by a universal key fob simulator includes a number of example steps. A transceiver of the universal key fob simulator is configured to wirelessly communicate with a backend cloud-based system. A map-calculating circuit of a mapping module of the universal key fob simulator can receive map locating signals. The map-calculating circuit may use the mapping signals to calculate map coordinates of a delivery vehicle associated with the universal key fob simulator. The map coordinates of the delivery vehicle can be stored in the memory buffers of the universal key fob simulator. The map coordinates of the delivery vehicle can be sent, via the transceiver, to the servers of the backend cloud-based system. The backend cloud-based system can then use the map coordinates to monitor the location of the delivery vehicle. After the delivery vehicle reaches a pre-determined location, the security module of the universal key fob simulator can receive a rolling security key of the RKE module of the target vehicle. The rolling security key of the RKE module of the target vehicle can be received, via the transceiver, from the servers of the backend cloud-based system. After receiving at least one rolling security key of the RKE module of the target vehicle, one or more buttons of the universal key fob simulator can be activated. A first actuation command can be generated by the security module of the universal key fob simulator in response to pushing a button of the universal key fob simulator by a user of the universal key fob simulator. The first actuation command and the rolling security key of the target vehicle can be sent to a RF transmitter of the universal key fob simulator. The Radio Frequency transmitter has one or more Application Specific Integrated Circuits to be highly configurable in generating a set of two or more stable RF signals at different frequency wavelengths in order to transmit the RF signals to command the RKE module of the target vehicle. The RF transmitter can transmit RF signals including the first actuation command and the rolling security key at the appropriate RF frequency specific to the RKE module of the target vehicle. The first actuation command can be executed, by the RKE module of the target vehicle, upon validating the rolling security key.

BRIEF DESCRIPTION OF THE DRAWINGS

The multiple drawings refer to the example embodiments of the design.

FIG. 1B illustrates a block diagram describing modules of an example universal key fob simulator.

Figure 1A:
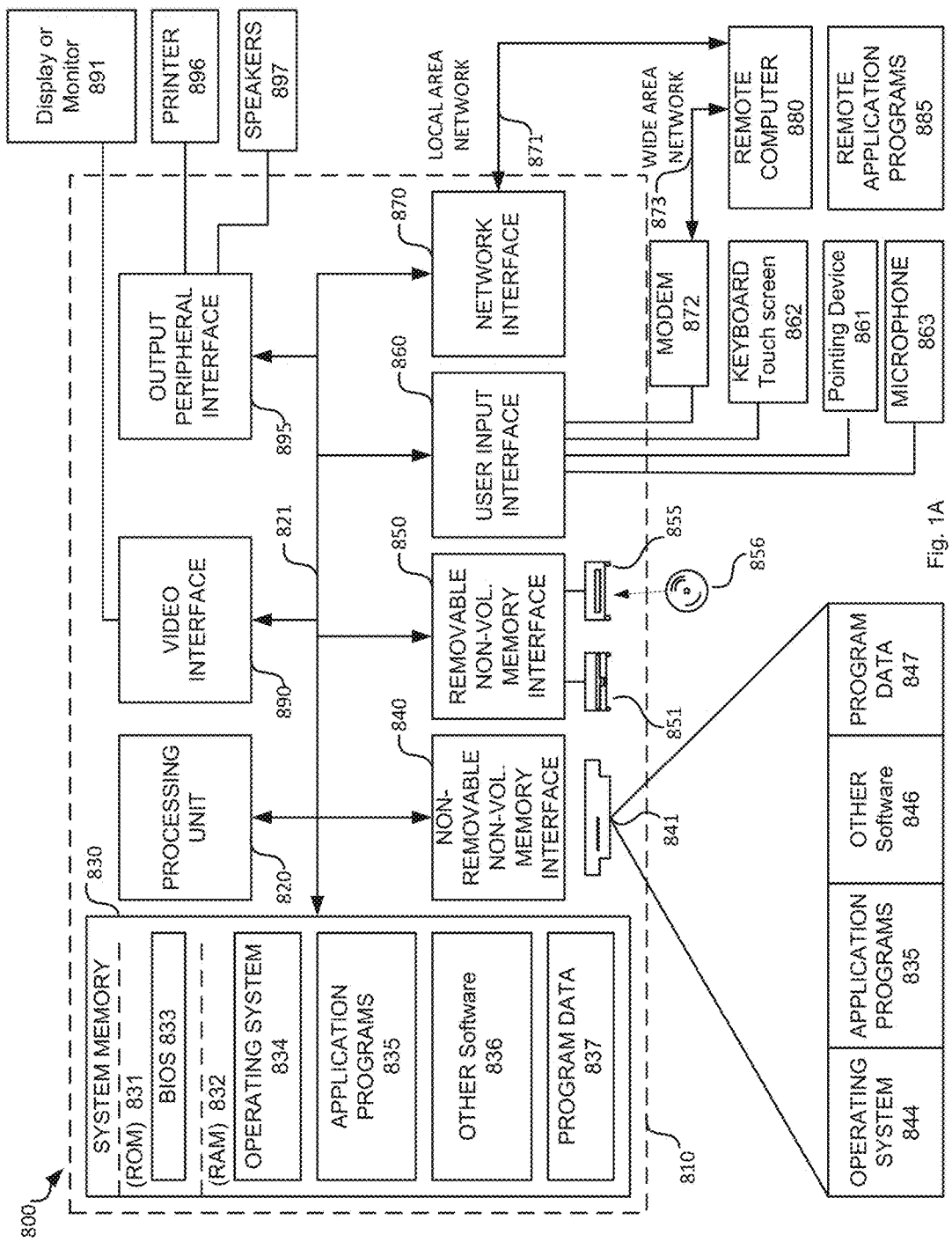
FIG. 1A illustrates a block diagram of an example computing system that may be used in an embodiment of one or more of the servers, client devices discussed herein and in-vehicle electronic modules.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DETAILED DISCUSSION

In the following description, numerous specific details are set forth, such as examples of specific package delivery services, named components, connections, number of databases, etc., in order to provide a thorough understanding of the present design. It will be apparent; however, to one skilled in the art that the present design may be practiced without these specific details. In other instances, well known components or methods have not been described in detail but rather in a block diagram in order to avoid unnecessarily obscuring the present design. Thus, the specific details set forth are merely exemplary. The specific details discussed in one embodiment may be reasonably implemented in another embodiment. The specific details may be varied from and still be contemplated to be within the spirit and scope of the present design.

Figure 10:
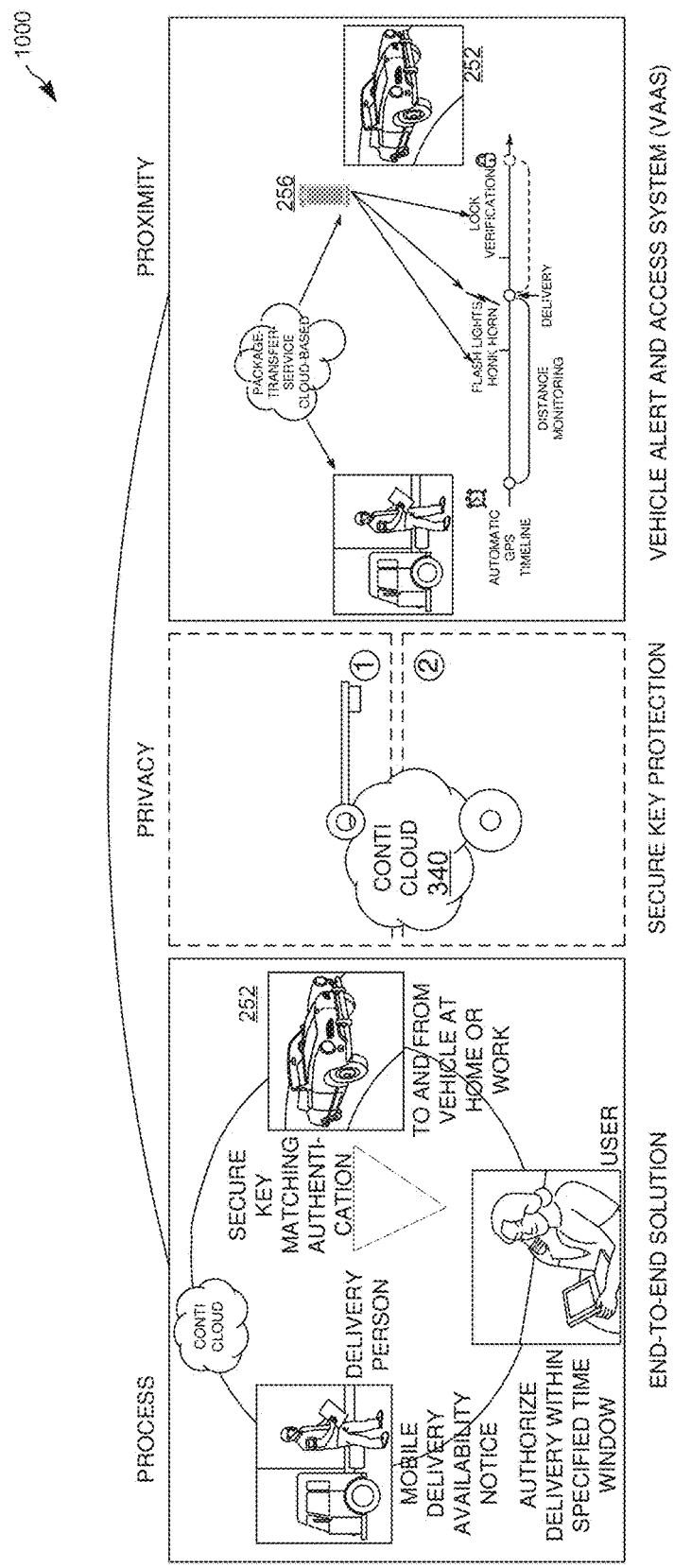
FIG. 10 illustrates a block diagram overview of an embodiment of the cloud-based systems for secure access to a vehicle using GPS positioning and key fobs and some of its features including i) process connectivity to multiple platforms, ii) built in privacy and security, and iii) invoking vehicle alert system via proximity.

In general, a universal key fob simulator can be used to allow secure access by a backend cloud-based system to a target vehicle that can facilitate exchange of packages or performing maintenance at home or work. The universal key fob simulator can include memory buffers, processors, at least one transceiver, and at least one RF transmitter. The transceiver of the universal key fob simulator can use wireless communication, e.g. cellular communication, to send and receive data to and from the backend cloud-based system. A Radio Frequency (RF) transmitter in the universal key fob simulator can transmit the RF signals to command a Remote Keyless Entry (RKE) module of the target vehicle that correspond to that vehicle's Make and Model. The universal key fob can have a map-calculating circuit (e.g., a GPS chip) to receive map locating signals (e.g., GPS signals) and to calculate map coordinates (e.g., GPS coordinates) of a delivery vehicle associated with the universal key fob simulator. The universal key fob can communicate with the backend cloud-based system and send the map coordinates to the backend cloud-based system. The backend cloud-based system can monitor the location of the delivery vehicle associated with the universal key fob simulator. The backend cloud-based system may be hosted on a cloud-based provider site. The cloud-based system allows secure access to a vehicle and provides a single common end-to-end solution for the service delivery providers to securely exchange packages with a target vehicle. The cloud-based system also allows secure access for vehicle maintenance providers to provide maintenance to the target vehicle. The secure access is granted when the delivery vehicle associated with the universal key fob simulator is in a close proximity of the target vehicle. The backend cloud-based system can also receive the GPS coordinates of the target vehicle. The GPS coordinates of the target vehicle can be sent via a client device (e.g., smartphone) associated with a user of the target vehicle. The backend cloud system, thus monitors the distance between the delivery vehicle and the target vehicle and only allows access when the delivery vehicle is in a close proximity of the target vehicle. When the delivery vehicle is in a close proximity of the target vehicle by a pre-determined distance, the backend cloud-based system may send a valid rolling security key of the target vehicle to the universal key fob simulator. The universal key fob simulator, by receiving the rolling security key, allows the buttons of the universal key fob simulator to be activated. Accordingly, a delivery person of the delivery vehicle can push a button (real button/or software simulated button) on the universal key fob simulator to provide an actuation (access) command such as lock, unlock, or alert. Then the RF transmitter of the universal key fob can transmit RF signals including the actuation command and the rolling security key to the RKE module of the target vehicle to be executed. The cloud-based system may use two or more paired-virtual keys, such as a dual-key protection mechanism, via secure key matching authentication in order to render hacking the backend cloud-based system or the universal key fob simulator useless. Additionally, the virtual keys are given a shelf life to limit authorized activation of the universal key fob simulator and subsequent access to the target vehicle to within a specified time window or a specific location. The first virtual key can be used to authenticate the communications received from universal key fob simulator associated with a delivery person of the delivery vehicle and the second virtual key can be used to authenticate a customer's request associate with the target vehicle. In general, only encrypted data is transmitted from the cloud-based system and the applications resident on client devices. The backend cloud-based system uses a GPS-based proximity module to control and track the package exchange or service delivery process, to speed up the package or service delivery and pick-up process, and to ensure security for the package exchange or service delivery. The backend cloud-based system for secure access to the target vehicle can provide picking up or delivery of a package to wherever vehicle is parked, including the service can deliver package to or pick-up package from a rental car while on business trip. (See FIG. 10 for a block diagram overview of an embodiment of the cloud-based systems for secure access to a vehicle using GPS positioning and key fobs and some of its features including i) process connectivity to multiple platforms, ii) built in privacy and security, and iii) invoking vehicle alert system via proximity). The cloud-based system for secure access to the target vehicle can also use a mobile delivery notice to verify the origination of the request as well as to communicate a successful delivery of a package, pick up of a package, or completion of a maintenance job.

In an embodiment, the GPS coordinates of the target vehicle 252 are stored in a memory of a key fob associated with the user of the target vehicle or a memory of a client device, such as a smart phone, associated with the user of the target vehicle. Additionally, the client device associated with the user of the target vehicle is configured to obtain the last activated rolling security key of the target vehicle 252 from a key fob associated with the user of the target vehicle. An application on the client device associated with the user of the target vehicle transmits the stored GPS coordinates of the target vehicle and the last activated rolling security key of the target vehicle 252 to the backend cloud-based system 260. In an example, the key fob associated with the user of the target vehicle is configured to use one of NFC, Bluetooth, or Wi-Fi communication with the client device associated with the user of the target to transfer the GPS coordinated and/or the last activated rolling security key of the target vehicle 252.

Example processes for and apparatuses to provide an automated process workflow for the entire cloud based system for secure access to a target vehicle are described. The following drawings and text describe various example implementations of the design. FIG. 1 and FIGS. 2A-2C illustrate example environments to implement the concepts.

The cloud based system for secure access to a target vehicle cloud system can be implemented in software, hardware electronics, and any combination of both and when one or more portions of the system are implemented in software, then that software is tangibly stored in an executable format on the one or more non-transitory storage mediums to be executed by a processing component.

FIG. 1B illustrates a block diagram describing modules of an example universal key fob simulator 150. The universal key fob simulator can include memory buffers 110 and processors 115. The universal key fob simulator can also have a wireless transceiver 119. The universal key fob simulator has a RF transmitter 120 that can transmit RF signals to the RKE module of the vehicle. The universal key fob simulator further includes a mapping module 122 that can have a GPS chip 123 as well as a security module 124.

Thus, the universal key fob simulator for sending actuation commands to a target vehicle 252 can include one or more memory buffers 110, one or more processors 115, a transceiver 119 that can use wireless communications to communicate with a backend cloud-based system, and a Radio Frequency (RF) transmitter 120 that can transmit RF signals to command a Remote Keyless Entry (RKE) module of the target vehicle. The one or more processors 115 assist in performing many tasks including either directly calculating a rolling security key code particular for the target vehicle or assisting in processing actuation commands containing one or more generated rolling security key codes particular for the target vehicle.

Also, the universal key fob simulator 150 can include a mapping module 122 that has a map-calculating circuit 123 that can receive map locating signals to calculate map coordinates of a delivery vehicle associated with the universal key fob simulator. The mapping module 122 can store the map coordinates of the delivery vehicle in the one or more memory buffers 115. The mapping module can send map coordinates of the delivery vehicle, via the transceiver 119, to servers of the backend cloud based system. A mapping algorithm in the backend cloud-based system can use the map coordinates of the delivery vehicle to monitor geographic location of the delivery vehicle as well as understand a geographic location of the target vehicle.

Also, the universal key fob simulator 150 can include the security module 124 that can receive, via the transceiver 119, one or more rolling security keys of the RKE module of the target vehicle from the servers of the backend cloud based system after the delivery vehicle reaches a predetermined distance between the geographical location of the delivery vehicle relative to the geographic location of the target vehicle.

Moreover, the universal key fob simulator 150 can include one or more physical or software buttons that can be pushed by a user of the universal key fob simulator 150. The buttons of the universal key fob simulator can to be activated after receiving at least one rolling security key of the RKE module of the target vehicle 252 from the servers of the backend cloud based system.

Additionally, in response to pushing a button of the universal key fob simulator 150, the security module 124 can generate an actuation command for an electro mechanical operation in the target vehicle. The security module 124 can send the actuation command and the rolling security key of the target vehicle to the RKE module of the target vehicle. The security module 124 can command the RF transmitter to transmit at the RF frequency of the target vehicle RF signals including the actuation command and the rolling security key to the RKE module of the target vehicle. Then after validating the rolling security key, the RKE module of the target vehicle can execute the actuation command to cause the electro mechanical operation in the target vehicle. The Radio Frequency (RF) transmitter may have one or more Application Specific Integrated Circuits to be highly configurable in generating a set of two or more stable RF signals at different frequency wavelengths in order to transmit RF signals to command a Remote Keyless Entry (RKE) module of the target vehicle.

The RF transmitter is configured to cooperate with the servers in the backend cloud-based system. A set of one or more databases is configured to cooperate with the servers of the backend cloud-based system. The databases store a set of different key protocols including their specific RF frequency for two or more current already existing protocols in a set of potential keys fob in the market. In the set of potential keys fob in the market, a first vehicle from a first vehicle manufacture has a different protocol than a second vehicle from another vehicle manufacture. The server is configured to select the appropriate protocol and its specific RF frequency from the set of databases based on referencing data stored in the system regarding the target vehicle and send the appropriate protocol and its specific RF frequency to the universal key fob simulator. The RF transmitter is configured to then use the one or more ASICs to generate the first actuation command at a first stable RF frequency to the particular target vehicle.

In an embodiment of the universal key fob simulator 150, the security module 124 can receive a first algorithm and a first data from the servers of the backend cloud-based system. The first algorithm can be implemented in a first routine of the security module that can be executed on the processors 115. The first algorithm can use the first data to determine a valid rolling security key of the RKE module of the target vehicle. The valid rolling security key of the RKE module of the target vehicle can then be stored in the memory buffers 110. Thus, instead of receiving the valid rolling security key of the RKE module of the target vehicle from the backend cloud-based server, the valid rolling security key of the RKE module of the target vehicle is generated in the universal key fob simulator based on the first algorithm and the first data that is received from the backend cloud-based system. In addition, the backend may send a set of two or more consecutive rolling security keys that have a pre-defined order, which are stored in the memory buffers 110.

In an embodiment of the universal key fob simulator 150, the security module 124 can receive the rolling security key after establishing a close proximity by a threshold distance between the package delivery vehicle and the target vehicle such that the actuation commands are executed only after establishing the close proximity by a threshold distance.

Also in the universal key fob simulator 150, the security module 124 can generate actuation commands in response to pushing the buttons of the universal key fob simulator. The actuation commands include one or more electro mechanical operations of unlocking doors, opening windows, opening trunks, closing trunks, turning engine on, turning engine off, opening or closing a sunroof, in the target vehicle.

In an embodiment of the universal key fob simulator 150, the transceiver has a cellular communication circuit to use cellular communication as the wireless communications between the backend cloud-based system and the transceiver 119 of the universal key fob simulator.

In an embodiment, the security module 124 of the universal key fob simulator 150 can receive, via the transceiver, two or more consecutive rolling security keys of the RKE module of the target vehicle from the servers of the backend cloud based system. The two or more consecutive rolling security keys have a pre-defined order. The security module can also generate two or more actuation commands in response to pushing buttons on the universal key fob simulator. The security module 124 can send each actuation command with a distinct next consecutive rolling security key based on the pre-defined order to the RKE module of the target vehicle such that after authentication of each rolling security key, the corresponding actuation command is executed by the RKE module of the target vehicle. Thus, the RF transmitter sends the initial actuation command with the first rolling security key and then sends a second actuation command with a second rolling security key, which is next in the consecutive rolling security key sequence. The rolling security key sequence can get out of sync and the RKE module can be program to expect a next security key but also accept a range of security keys.

In an embodiment, the transceiver 119 of the universal key fob simulator can include a virtual key when communicating to the backend cloud-based system. The virtual key can be used by the backend cloud-based system to authenticate the communications.

In an embodiment, the universal key fob simulator is configured, when used by a delivery person associated with the delivery vehicle, i) to issue an actuation command of electro-mechanically causing any of lights of the target vehicle to flash or otherwise turn on and a horn of the target vehicle to honk. The universal key fob simulator is configured to then i) to issue another actuation command of electro-mechanically causing any of open a trunk or unlock a door of the target vehicle to perform either 1) a package exchange or 2) a vehicle maintenance service on the target vehicle. Also, the universal key fob simulator is also configured to when used by the delivery person associated with the delivery vehicle to present a notification to remind the delivery person to close and lock the target vehicle after performing the package exchange or vehicle maintenance service.

In an embodiment of the universal key fob simulator 150, the map-calculating circuit is a Global Positioning System, the map locating signals received by the map-calculating circuit are Global Positioning System (GPS) signals, and the map coordinates are GPS coordinates. Also, the mapping module 122 can send the GPS coordinates of the delivery vehicle, via the transceiver 119, to the servers of the backend cloud based system.

In an embodiment, a GPS-based proximity module in the backend cloud-based system can use the GPS coordinates of the delivery vehicle and an already know GPS coordinates of the target vehicle to monitor a distance between the delivery vehicle 322 and the target vehicle 252.

In an embodiment, the RF signal transmitter 119 can be capable of transmitting RF signals at multiple wavelengths such that universal key fob can be configured to produce multiple RF frequencies to allow the delivery person to access a plurality of different kinds of vehicles, manufactured from a number of different manufactures.

High Level Description of Each Transaction

Figure 3A:
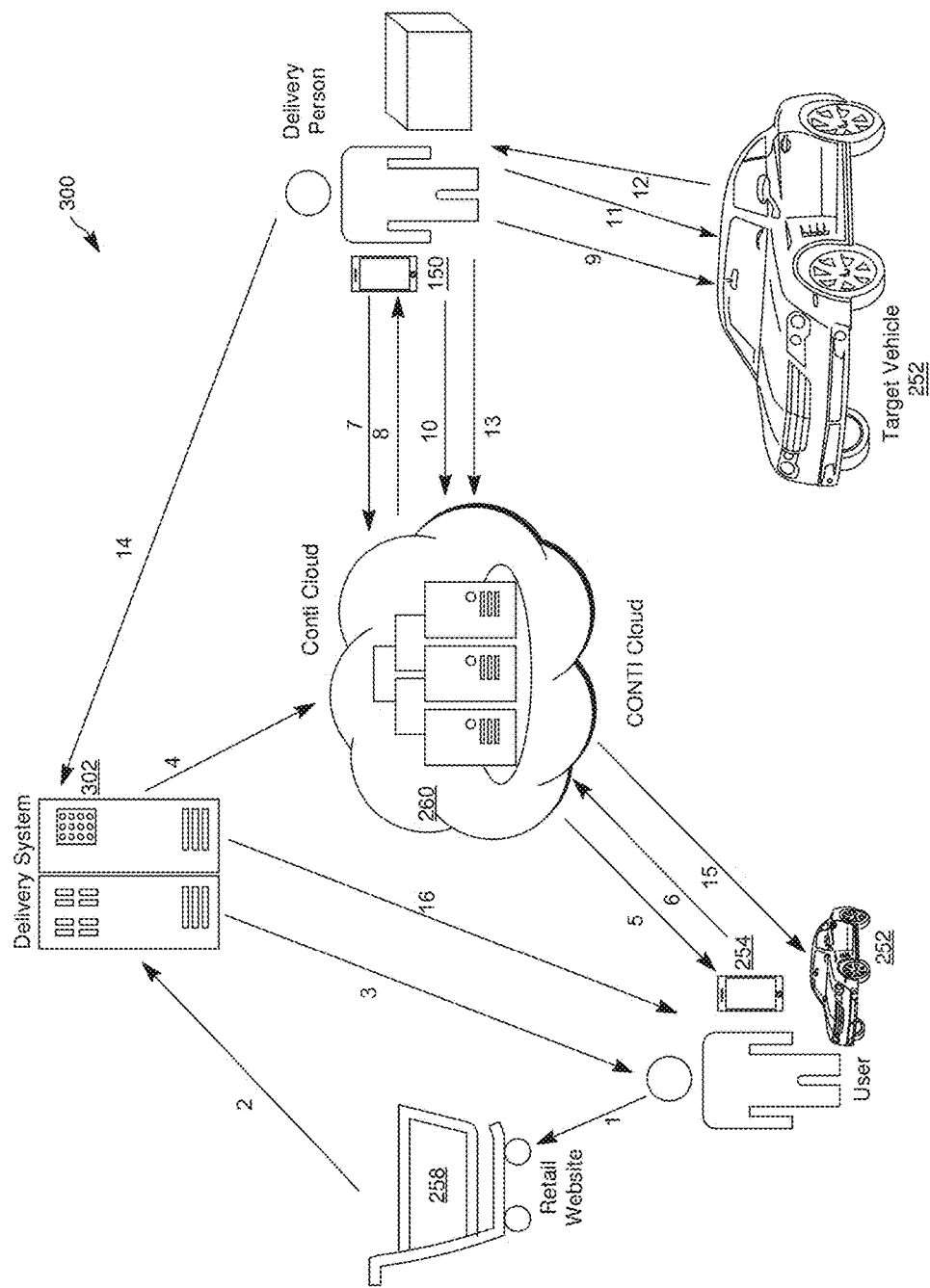
FIGS. 3A-3C illustrate block and flow diagrams of embodiments of cloud-based systems for secure access to a vehicle using GPS positioning and key fobs.
Figure 3B:
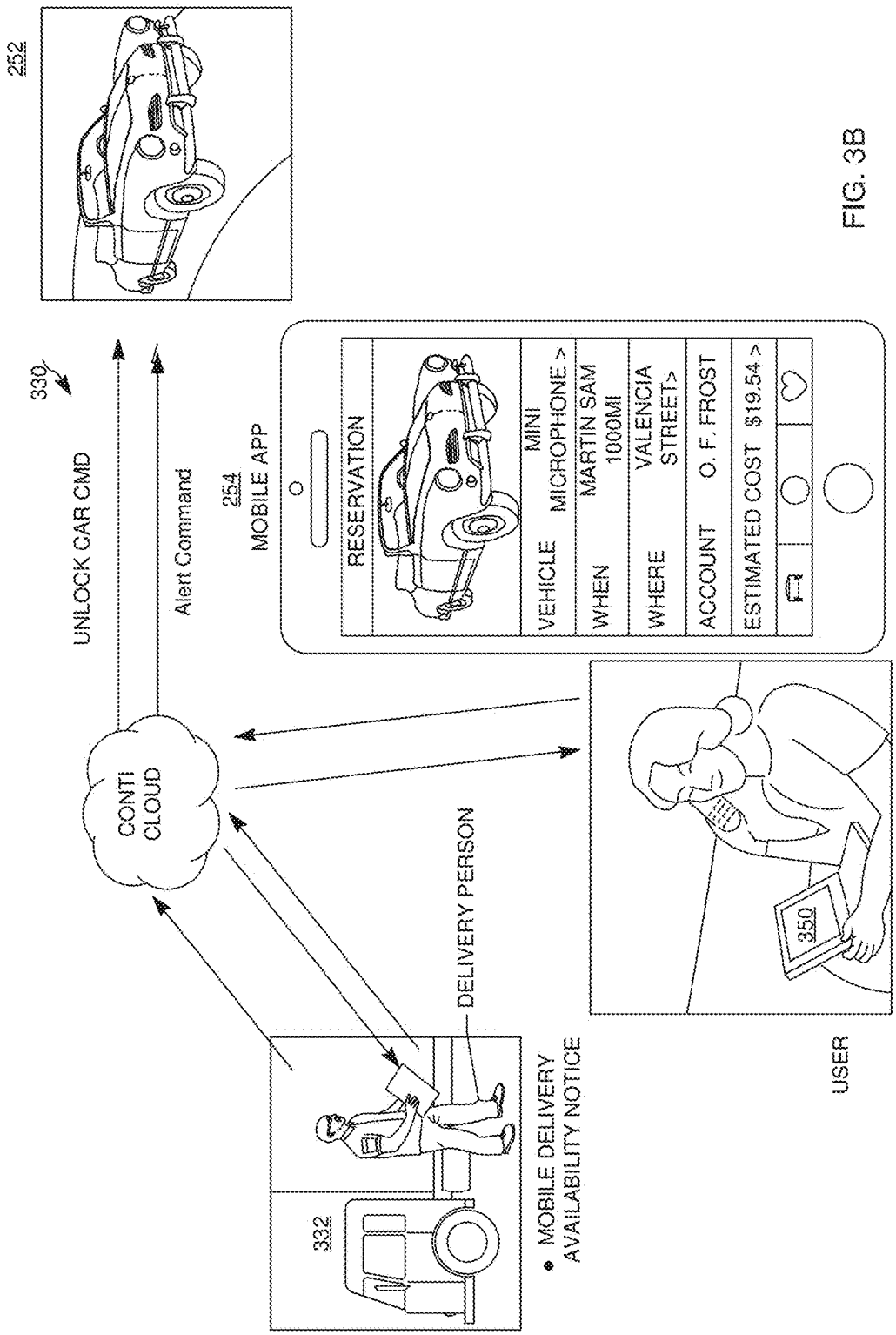
Figure 3C:
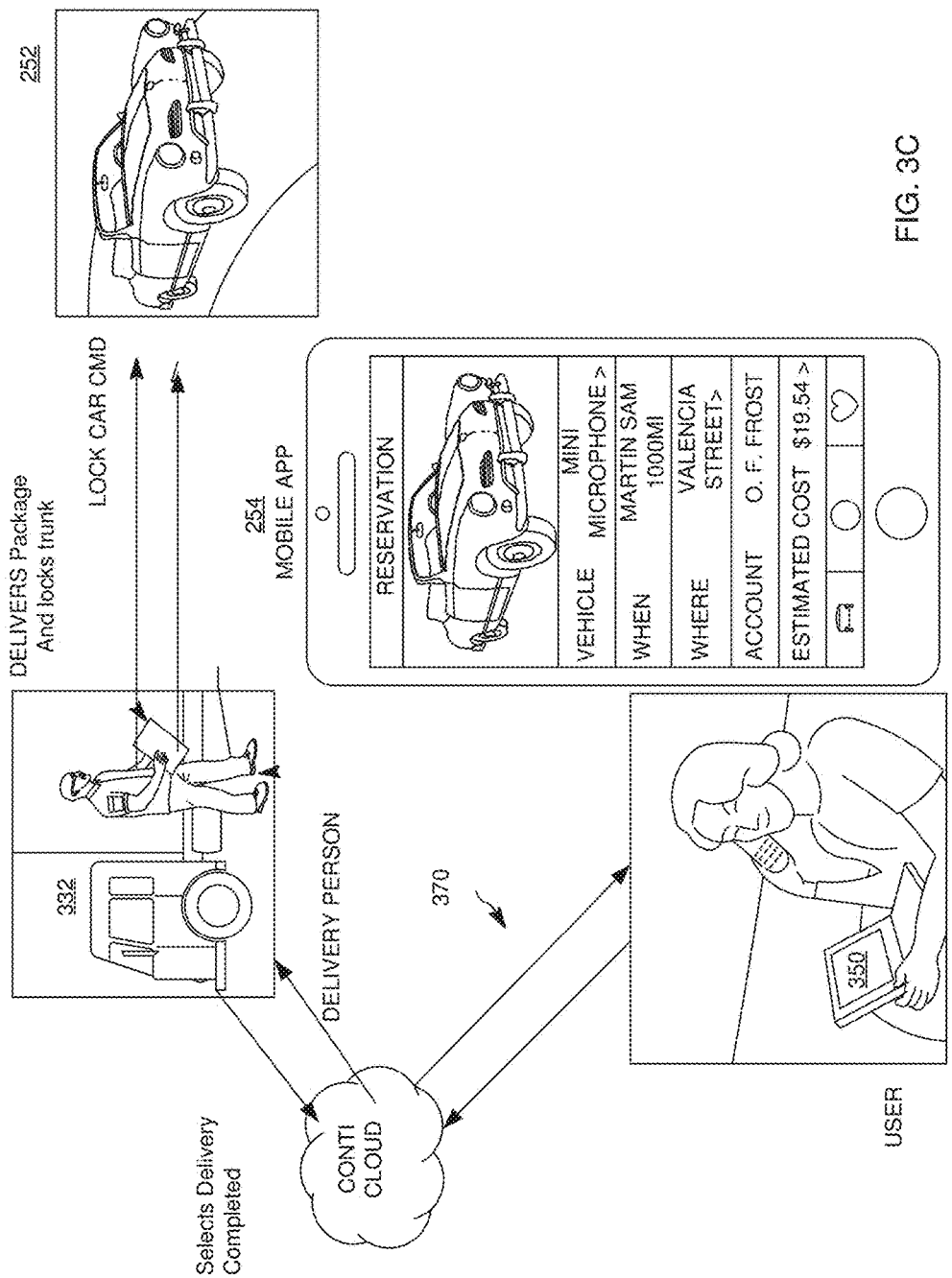

FIGS. 3A-3C illustrate block and flow diagrams of embodiments of the alternative delivery system.

In an embodiment, a first cellular communication can be used between the universal key fob simulator associated with the delivery vehicle and the control module of the cloud-based system 260. A second cellular communication can also be used between the client device associated with the user and the control module of the cloud-based system 260.

Figure 4A:
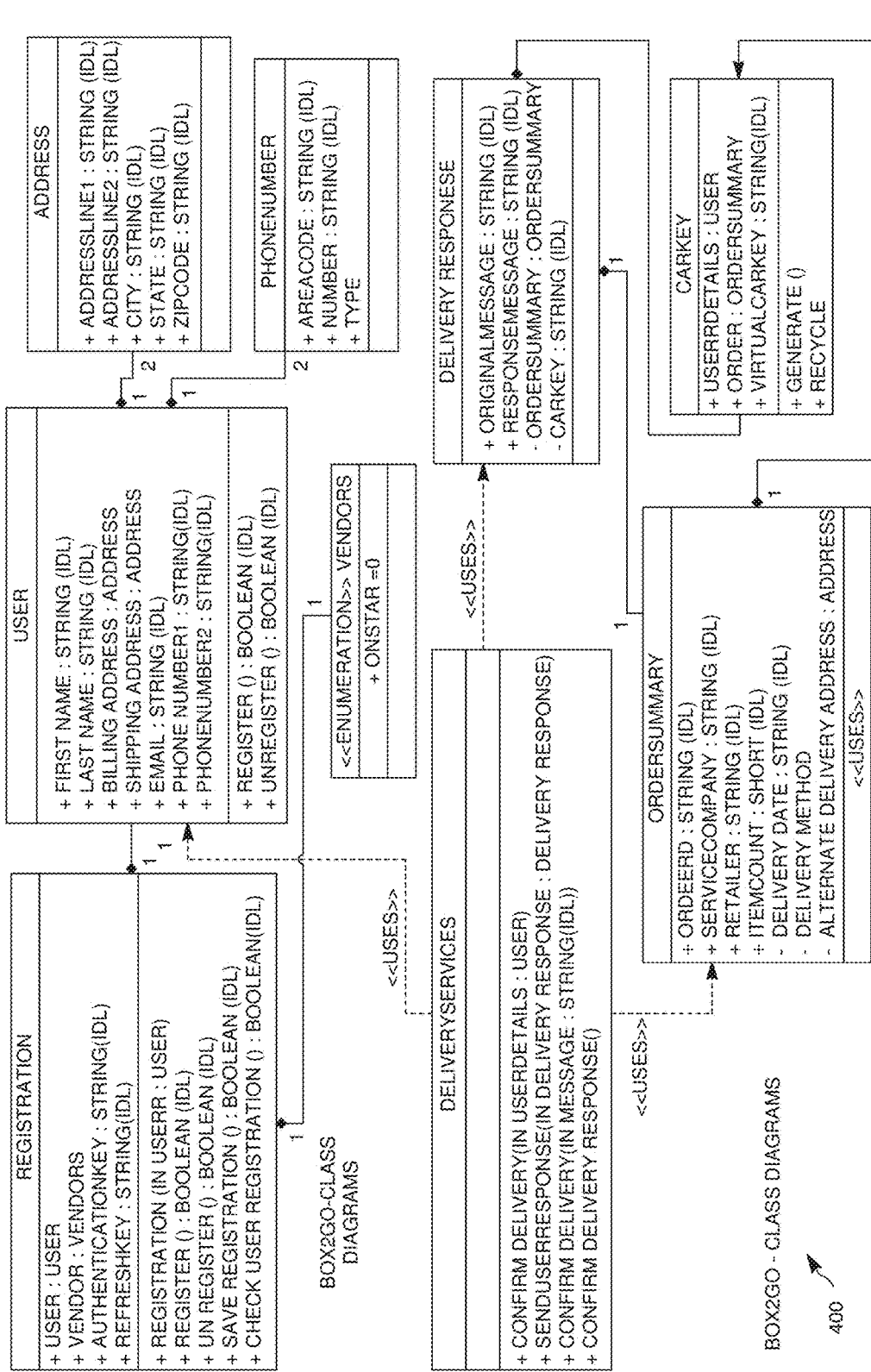
FIGS. 4A and 4B illustrate an example class diagram of an embodiment of an application programming interface for the alternative package pickup and delivery system.
Figure 4B:
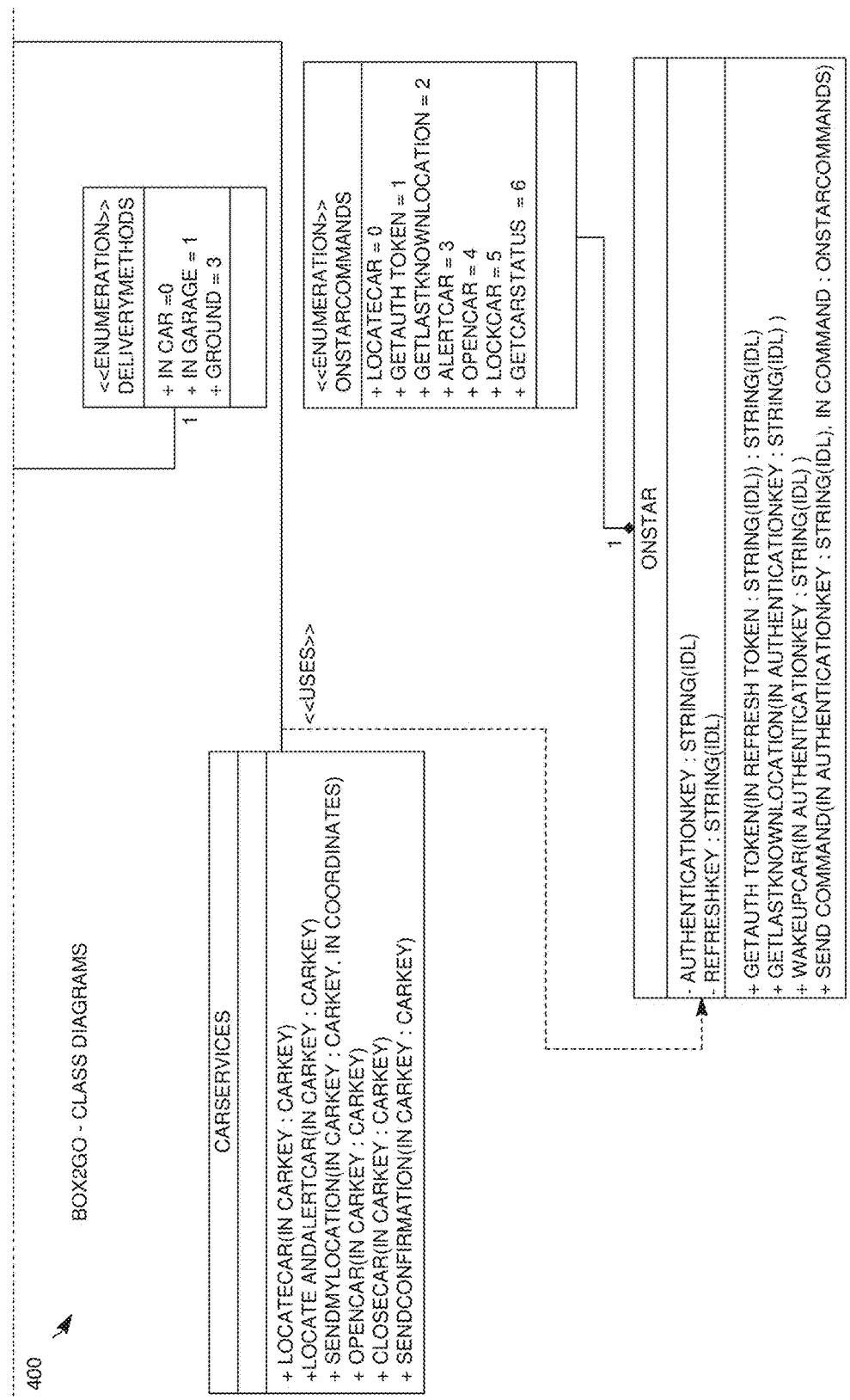

The package pickup and delivery system is discussed. The system includes a cloud based system for secure access to a target vehicle that is hosted on a cloud-based provider site, one or more package delivery entity systems, such as FedEx, having both a service website as well as one or more delivery vehicles with client devices having a delivery application resident in each client device. The delivery application can receive a security code for the security system of a vehicle that when transmitted by the client device to the vehicle can cause electromechanical actions within that vehicle including: unlocking doors, opening windows, opening trunks, closing trunks, opening and closing a sunroof or moon roof in the vehicle. The cloud based system for secure access to a target vehicle is hosted on a cloud-based provider site that contains one or more servers and one or more databases. The cloud based system for secure access to a target vehicle is coded to utilize a protocol, including HTTP, to engage in a request and response cycle with either i) a mobile device application resident on a client device of a user/customer, ii) a web-browser application resident on the client device of the user, or iii) both. The Box2Go, described below, may be an example of the mobile application that can reside on user's mobile device. The cloud based system for secure access to a target vehicle has one or more routines to automate the package to and from vehicle delivery. The cloud based system for secure access to a target vehicle has one or more open application programming interfaces to standardly exchange information between the two or more package delivery sites. (See FIGS. 4A and 4B for an example class diagram of an embodiment of an application programming interface for the alternative package pickup and delivery system.) A hardware module in delivery vehicle's client device (e.g., a key fob simulator) can transmit RF signals including the security code for the vehicle such that it causes electromechanical actions within that given vehicle. The hardware module can be configured to produce multiple RF frequencies to allow the delivery person performing the cloud based system for secure access to access a plurality of different kinds of vehicles, manufactured from a number of different manufactures. Thus, the delivery vehicle's client device can be used to lock/unlock multiple vehicles, e.g., become a universal key fob. The cloud based system for secure access cloud system has a communication module scripted to exchange information with a delivery application on a client device in order to send or receive information from a delivery person. The cloud based system for secure access to a target vehicle has an additional communication module for communicating to a user of the target vehicle having a package picked up or delivered to that vehicle, which is scripted to exchange information with a mobile or desktop application on a client device of the user. The mobile or desktop application on the client device of the user can communicate with the cloud based system for secure access cloud system including uploading user credentials and GPS coordinates and/or security key of the user's vehicle. The package to be delivered may be a retail shop item, flowers, perishables, tobacco and alcohol, postal letters, food or other consumable items, and other similar deliverable items. The vehicles include any mobile location and are not limited to automobiles, trucks, vans, motorcycles, and other similar transportation mechanisms.

A user's key fob can have a module such as a chip with a memory to receive GPS signals and calculate GPS coordinates. The package transfer application on a user's smart phone can either use blue tooth to obtain the vehicle's GPS coordinates from a navigation module in the vehicle or from the module in the key. The GPS coordinates can be stored in the key fob simulator each time the target vehicle's ignition is turned off or the key fob simulator is used to lock the vehicle. Each time the user's key fob simulator is used to either turn off the engine or to lock the target vehicle, the GPS coordinates of the key fob simulator is calculated and stored in the key fob. The user's key fob simulator is also configure to use wireless communication such as peer-to-peer Bluetooth communication to transfer the stored data in the key fob simulator to another device in its vicinity implementing the same protocol. As an example, Bluetooth communication can be used for transferring the GPS coordinates of the user's key fob simulator to a user's client device, where the user can later upload the GPS coordinates to the cloud based system for secure access cloud system. In an example, the GPS coordinates are automatically uploaded by a mobile device application or a web-browser application resident on the client device of the user to the cloud based system for secure access cloud system upon being received from the user's key fob.

In an embodiment, the user's key fob simulator may not receive the GPS signals or may not calculate the GPS coordinates but may receive and store the GPS coordinates from a GPS calculating module inside the target vehicle. As an example, when the target vehicle is turned off or locked, the GPS coordinates of the target vehicle are transmitted via for example Bluetooth communications from the target vehicle to the user's key fob. As described above, the stored GPS coordinates can be transferred out of the key fob.

In an embodiment, the mobile application of the client device of the user can be used for obtaining the GPS coordinates. For example, when the car is turned off or when it is locked, the user's key fob simulator can use for example Bluetooth communications for communicating with the mobile application of the client device of the user and instruct it to obtain the GPS coordinates and send them to the cloud based system for secure access cloud system.

The user's key fob simulator and the security system of the user's vehicle cooperate based on a same algorithm and seed for creating the rolling security codes. The security system of the user's car uses the algorithm, seed, and current rolling security code to generate the next rolling security code. Each time a lock/unlock button on user's key fob simulator is pushed a new rolling security code is generated and transmitted to the user's car. If the security system of the user's vehicle receives the expected rolling security code, it accepts and executes the commands such as lock/unlock. Both, the key fob module installed in the user's car and the user's key fob simulator implement the same algorithm with the same seed; and thus, based on the same current rolling security code, they generate the same next rolling security code. Therefore, assuming the user's key fob simulator and the security system of the user's vehicle are in sync, i.e., use the same existing rolling security code to generate the next rolling security code, the security system expects the same next rolling security code that user's fob transmits and thus executes the user's commands. In case the user's key fob simulator and the security system of the user's vehicle get out of sync, the security system of the user's vehicle usually searches a predefined number of next rolling codes (e.g., a couple of thousands) to find a corresponding match. The user's key fob simulator is configured such that each time a button on the user's key fob simulator such as lock/unlock is pushed the rolling security code is stored in the key fob. The stored rolling security code can be transferred to another device in the same way GPS coordinates are transferred. In an example, the rolling security code is encrypted.

Thus as discussed, user's key fob simulator is configured with wireless communication functionality such as Bluetooth communication to transmit both the GPS coordinates and the rolling security code to a user's client device. The transmitted data can be encrypted. A downloadable mobile application from the cloud based system for secure access cloud system resident on the client device of a user/customer, or a web-browser application from the cloud based system for secure access cloud system resident on the client device of the user can implement the Bluetooth protocols to receive the GPS coordinates and the rolling security code from the user's key fob.

FIG. 3A illustrates an example sequence of steps.

(1) The User uses either a mobile application on their client device or accesses a retailer's website via a browser on their client device. The retailer's website collects order information including the products selected. The client device submits order and shipping information via the mobile application to the retailer's website, in the case of delivering to a vehicle, the shipping information can include the vehicle VIN. The user interface of the retailer's website offers the alternative delivery destination of the consumer's/user's vehicle as a delivery destination. Note, the retailer's website user interface may show the alternative delivery destination of the consumer's/user's vehicle and an additional monetary charge may be associated with this alternative delivery destination. The additional monetary charge may be charged on a per delivery instance basis or based on a subscription basis.

(2) The retailer's website sends shipping information to the package delivery system (see for example, the Delivery System in FIG. 3A), such as FedEx.

(3) The package delivery system sends confirmation including a Tracking Number to the User on their client device.

(4) The package delivery system sends a notification to the cloud based system for secure access cloud system, including the Tracking Number and VIN via the standardized open application programming interface. The notification including the shipping Tracking Number and VIN are stored in the databases of the cloud based system for secure access cloud system. The package delivery system may have already received, through a secure communication channel, a first virtual key, e.g., a public key, from the cloud based system for secure access cloud system. The package delivery system can include the first virtual key with the communications to the cloud based system for secure access cloud system so that the cloud based system for secure access cloud system can match the public key with its associated private key and authenticate the communication.

(5) The cloud based system for secure access cloud system sends a first notification to the user on either the mobile application or the desktop application of their client device and confirms with the User their desire to have a package shipped to their vehicle with the Tracking Number and VIN for the package delivery. A confirmation notice from the user also acts as a security mechanism to ensure that the user did in fact elect to have a package delivered to their vehicle. On or about the delivery time, a second notification is sent by the cloud based system for secure access cloud system to the user on either the mobile application or the desktop application of their client device to reconfirm the delivery and requesting the GPS coordinates of the vehicle as well as a rolling security code that was used by the security system of the vehicle to lock the vehicle.

(6) The User supplies a response via the mobile or desktop application on a client device of the user and sends a confirmation in response to the first notification. In response to the second notification, the user may supply a second confirmation including the GPS coordinates of the vehicle and the rolling security code, both encrypted, to the cloud based system for secure access cloud system. The confirmation notices may also serve as the permission from the user to unlock the target vehicle for the delivery or pick up. The cloud based system for secure access cloud system can use a multiple step, such as a two-phase, verification mechanism involving two security keys. The cloud-based infrastructure is scripted to validate authorization for the package delivery service to a registered owner's vehicle. The source of initiating the request to open up the car is verified twice. As noted above, the first virtual key, such as a public key, coming from a package delivery entity is verified by matching it to its associate private key. The second key is the rolling security code for the security system of the vehicle. (See FIGS. 8A-8D on block diagrams of embodiments of the multiple paired virtual keys and security authorization notices used by the cloud based system for secure access.)

As described, the first virtual key is provided by the cloud based system for secure access cloud system using a secure communication to the package delivery system. The package delivery system can supply the first key to a client device in the package delivery vehicle or to a client device of the package delivery person. The first key can be used by the cloud based system for secure access cloud system to validate commands/request/data received from the package delivery system, package delivery vehicle, and package delivery person when the received command/request/includes the first virtual key. In an example, the first key is a public key generated by the cloud based system for secure access cloud system such that only the cloud based system for secure access cloud system knows an associated private key matching the public key and can authenticate the received command/request/data including the first virtual key. As described with respect to FIGS. 3A-3C, the GPS coordinates of the package delivery vehicle can be received from the package delivery person/package delivery vehicle. In an example, the package delivery person uses the delivery application in their client device to send the Tracking Number and the first virtual key in a message to the cloud based system for secure access cloud system in order to obtain the target vehicle's information including its current location information. The cloud based system for secure access cloud system responds to the delivery application in the universal key fob of the delivery person, supplying the target vehicle's GPS location information.

In an embodiment, the GPS coordinates of the target vehicle of the user can be obtained by a first map-calculating circuit in the key fob associated with the user of the target vehicle. The first map-calculating circuit is configured to receive GPS signals and to calculate the GPS coordinates of the target vehicle. Using one of NFC, Bluetooth, or Wi-Fi communication, the key fob associated with the user of the target vehicle can transmit the GPS coordinates of the target vehicle to the client device associated with the user of the target vehicle. An application on the client device associated with the user of the target vehicle can upload the GPS coordinates of the of the target vehicle, via the second cellular communication, to the control module of the cloud-based system. The application on the client device associated with the user of the target vehicle can be downloadable from a website associated with the cloud based system. The client device associated with the user of the target vehicle can periodically receive the GPS coordinates of the target vehicle from the key fob associated with the user of the target vehicle. Alternatively, the client device associated with the user of the target vehicle can receive the GPS coordinates of the target vehicle when an engine of the target vehicle is turned off or when the target vehicle is locked.

In an embodiment, the GPS coordinates of the target vehicle of the user can be obtained by a second map-calculating circuit in the client device, e.g., a smartphone, associated with the user of the target vehicle. The second map-calculating circuit can receive GPS signals and can calculate the GPS coordinates of the target vehicle. The application in the client device of the user of the target vehicle can upload, via the second cellular communication, the GPS coordinates of the of the target vehicle to the control module of the cloud-based system. The client device associated with the user of the target vehicle can either periodically calculate and upload the GPS coordinates of the target vehicle, or when an engine of the target vehicle is turned off or when the target vehicle is locked.

In an embodiment, the GPS coordinates of the target vehicle of the user can be obtained by the first map-calculating circuit in the key fob associated with the user of the target vehicle. The first map-calculating circuit is configured to receive GPS signals and to calculate the GPS coordinates of the target vehicle when an engine of the target vehicle is turned off or when the target vehicle is locked. The GPS coordinates of the target vehicle can be stored in a memory buffer of the key fob associated with the user of the target vehicle. The GPS coordinates can be transmitted, upon activating one of NFC, Bluetooth, or Wi-Fi communication, between the key fob associated with the user and one of a smartphone 254 or a desktop computer 350 associated with the user. The GPS coordinates can then be uploaded either via the second cellular communication between client device associated with the user of the target vehicle and the website of the cloud-based system, or via Internet connections between the desktop computer 350 of the user and the website of the cloud-based system.

In an embodiment, the GPS coordinates of the delivery vehicle can be obtained by a third map-calculating circuit in the universal key fob simulator associated with delivery vehicle. The third map-calculating circuit can receive GPS signals and can calculate the GPS coordinates of the delivery vehicle. An application on the universal key fob simulator associated with the delivery vehicle can upload the GPS coordinates of the delivery vehicle, via the first cellular communication, to the control module of the cloud-based system. The application on the universal key fob simulator associated with the delivery vehicle can be downloaded from the website associated with the cloud based system.

The second key is the previously used rolling security key (code) of the security system of the user's vehicle (target vehicle). The rolling key of the vehicle when it was last locked is provided by the user to the cloud based system for secure access cloud system. The cloud based system for secure access generates the next rolling security code and provides the next rolling security code to the universal key fob of the delivery person. The universal key fob of the delivery person can transmit the code to the vehicle and unlock the vehicle.

Generating the next rolling security code of the security system of a car requires the knowledge of the algorithm used by the car/car-key manufacturer and the seed used by the manufacturer. By knowing the algorithm and the seed, the cloud based system for secure access also needs the last used rolling security code to generate the next rolling code. The cloud based system for secure access can use the algorithm and seed of multiple car manufacturers and become a universal key fob simulator that can generate and transmit the next rolling security code from the previously used rolling code. In an embodiment, the algorithms and seeds are kept and the algorithm is only executed in the cloud based system for secure access cloud system and only the next rolling security keys (codes) are transferred to the universal key fob of the delivery person. In an example, the algorithms and seeds can be implemented in the universal key fob of the delivery person. In both cases, the client device of a delivery person can act as a universal key fob.

As discussed, the cloud based system for secure access cloud system is configured to receive both the GPS coordinates and the last used rolling security code of the target vehicle from the user. The GPS coordinates of the package delivery vehicle can also be transmitted to the cloud based system for secure access cloud system. Thus, the cloud based system for secure access cloud system can monitor the distance between the package delivery vehicle and the target vehicle. The cloud based system for secure access cloud system can also be equipped with algorithms and seeds of several car (car-key) manufacturers such that when the cloud based system for secure access cloud system receives the last used rolling security code of the target vehicle, based on make, model, and year of the vehicle, it can use the corresponding algorithm and seed to generate the next rolling security codes. The generated rolling security codes can be transmitted to a client device of the package delivery person which is capable of transmitting the code in the appropriate RF frequency (e.g., 4.44 MHz) transforming the client device of the package delivery person into a universal key fob. Since each rolling security code can be used once, the cloud based system for secure access may provide a predetermined number, e.g., 10, of consecutive rolling security codes to the universal key fob simulator (client device of package deliverer) to be used for different commands of Alert/Unlock/Lock the target vehicle.

As discussed, the universal key fob simulator is configured with an antenna and transmission circuit to transmit at the specific frequency that the target car's remote key entry module is anticipating and configured to receive signals/commands at, such as 4.44 MHz. The remote key entry module located inside the target vehicle in order to unlock the vehicle needs to receive both one of the rolling security key codes that is within the acceptable window of synchronization and at the specific RF frequency from the universal key fob.

The universal key fob simulator is configured with an enhanced broadcast range than a typical key fob. The cloud based system for secure access cloud system establishes two threshold distances for actions to occur with the package transfer with the target vehicle. The target vehicle can be sent a command to produce an alert such as honking the horn or flashing a light (e.g., hazard light) when a close proximity by a first distance is established between the package delivery vehicle and the target vehicle to help the delivery service provider's driver to locate the exact vehicle in a parking lot. The target vehicle can be sent another command to unlock when a close proximity by a second distance smaller than the first distance is established between the package delivery vehicle and the target vehicle. As described, using the GPS coordinates of the package delivery vehicle and the target vehicle, the cloud based system for secure access cloud system can monitor the distance between the package delivery vehicle and the target vehicle. In an embodiment, when a close proximity by the first distance is established, the cloud based system for secure access cloud system instructs the delivery application of the universal key fob of the delivery vehicle/person to send the alert command to the target vehicle. Also, when a close proximity by the second distance is established, the cloud based system for secure access cloud system instructs the delivery application to send the unlock command to the target vehicle. In another embodiment the commands are imitated by the delivery person but the delivery application of the universal key fob of the delivery person can be controlled by the cloud based system for secure access cloud system such that to prevent certain command before certain close proximities are established.

(7) After the package arrives at the same city, the package delivery entity system's delivery person uses the package delivery application in their client device to send the Tracking Number to the cloud based system for secure access cloud system in order to obtain the vehicle's information including its current location information. In one embodiment a GPS-based proximity system in the cloud based system for secure access cloud system using the GPS coordinates of the package delivery vehicle and the target vehicle can calculate the distance between the package delivery vehicle and the target vehicle to notify the delivery person when the delivery vehicle is in the vicinity of the target vehicle and then the cloud based system for secure access can supply the next rolling security code of the security system of the target vehicle. In another embodiment, a universal key fob of the delivery person can calculate the distance between the package delivery vehicle and the target vehicle and when in the vicinity of the target vehicle can request the security system of the target vehicle. Optionally, the cloud based system for secure access can independently calculate the distance between the package delivery vehicle and the target vehicle and send the next rolling security code after verifying the package delivery vehicle is in the vicinity of the target vehicle.

Figure 7A:
FIGS. 7A-7D illustrate block and flow diagrams of embodiment of the value proposition of the alternative delivery system.
Figure 7A:
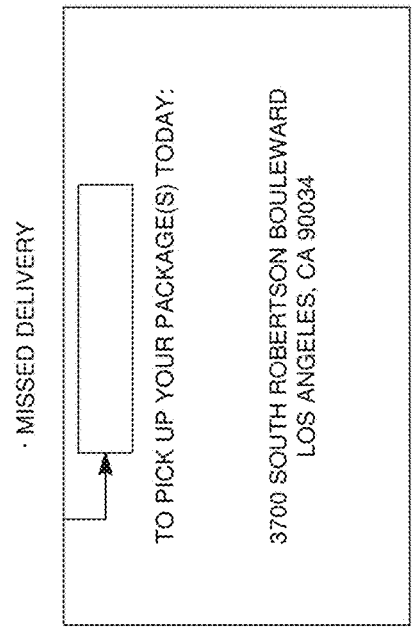
Figure 7A:
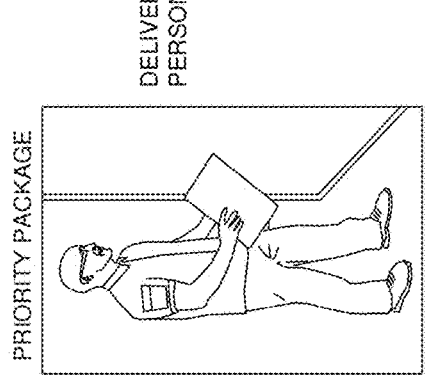
Figure 7A:
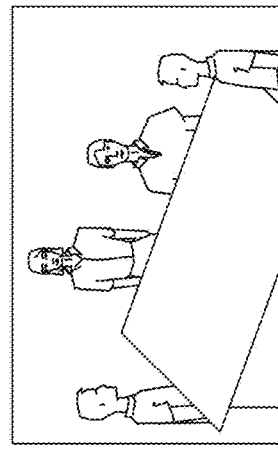
Figure 7B:
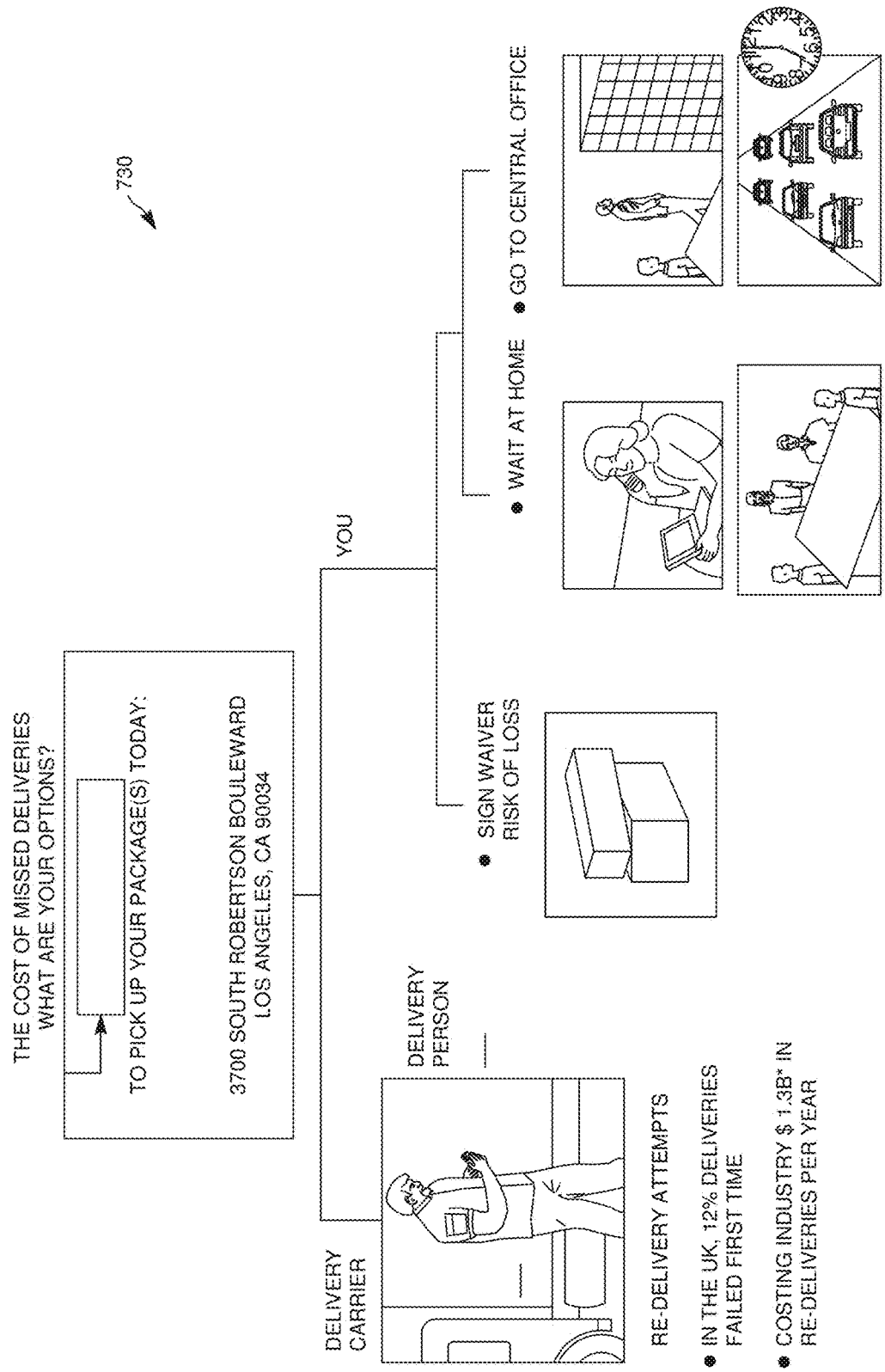
Figure 7C:
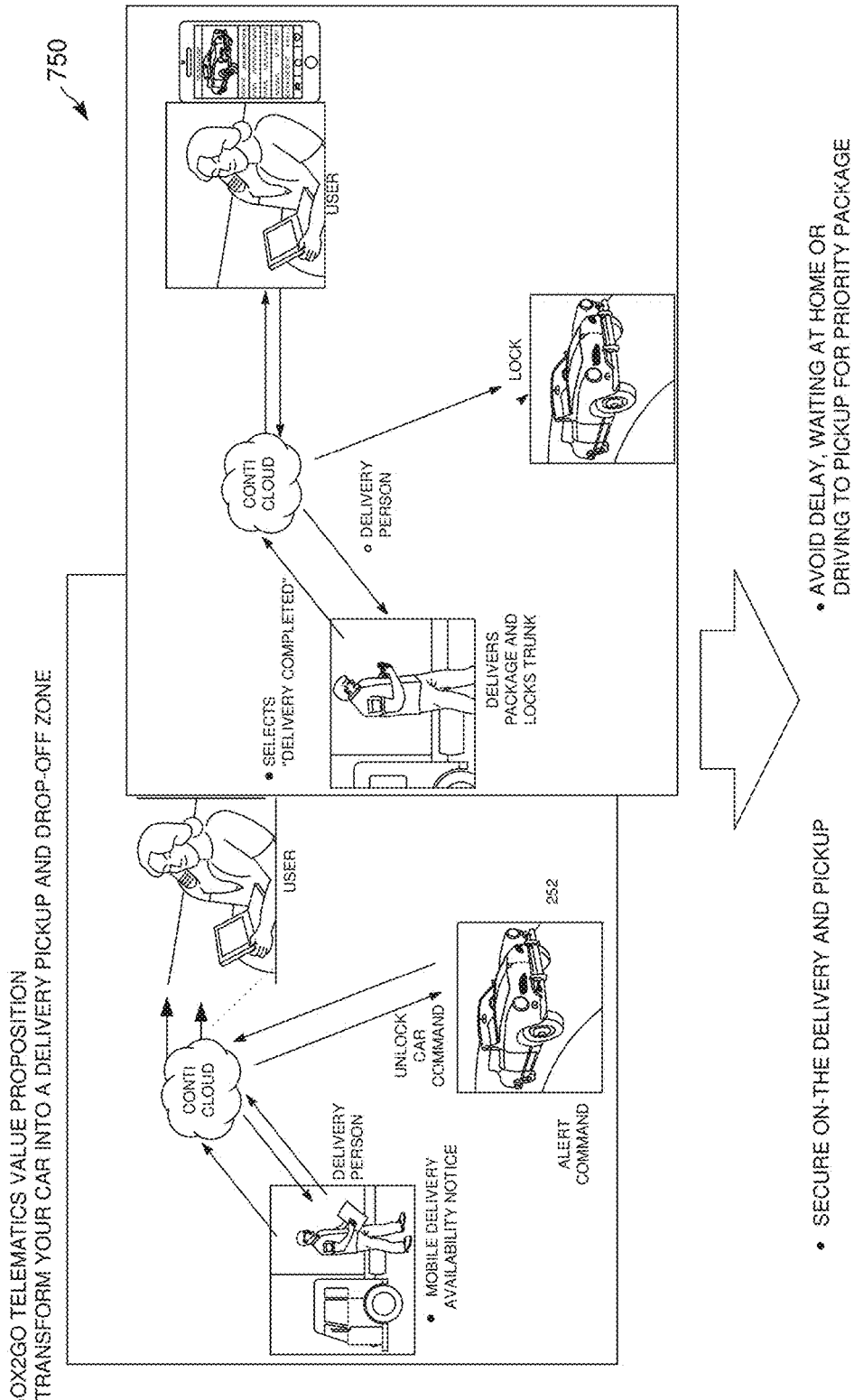
Figure 7D:
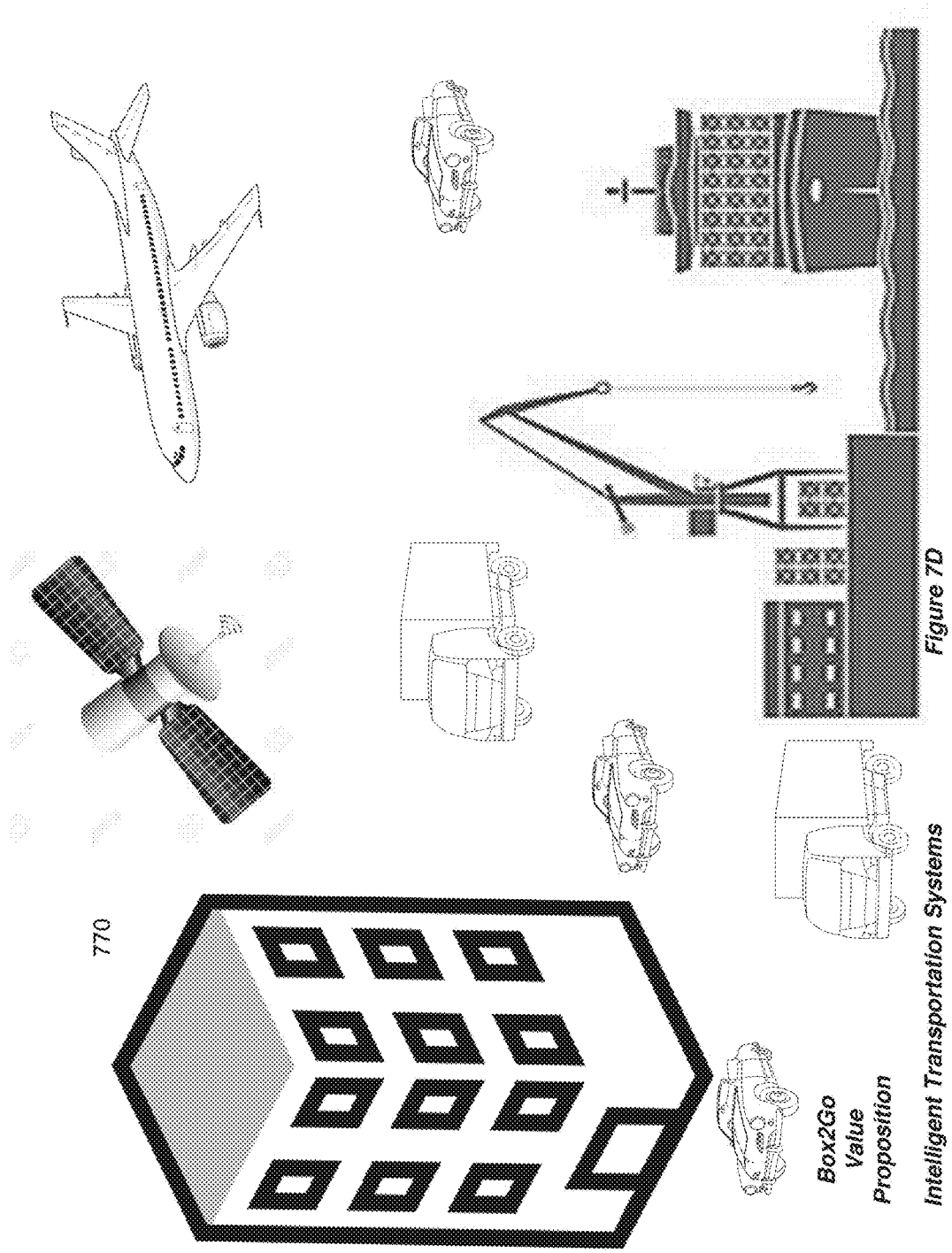
Figure 8A:
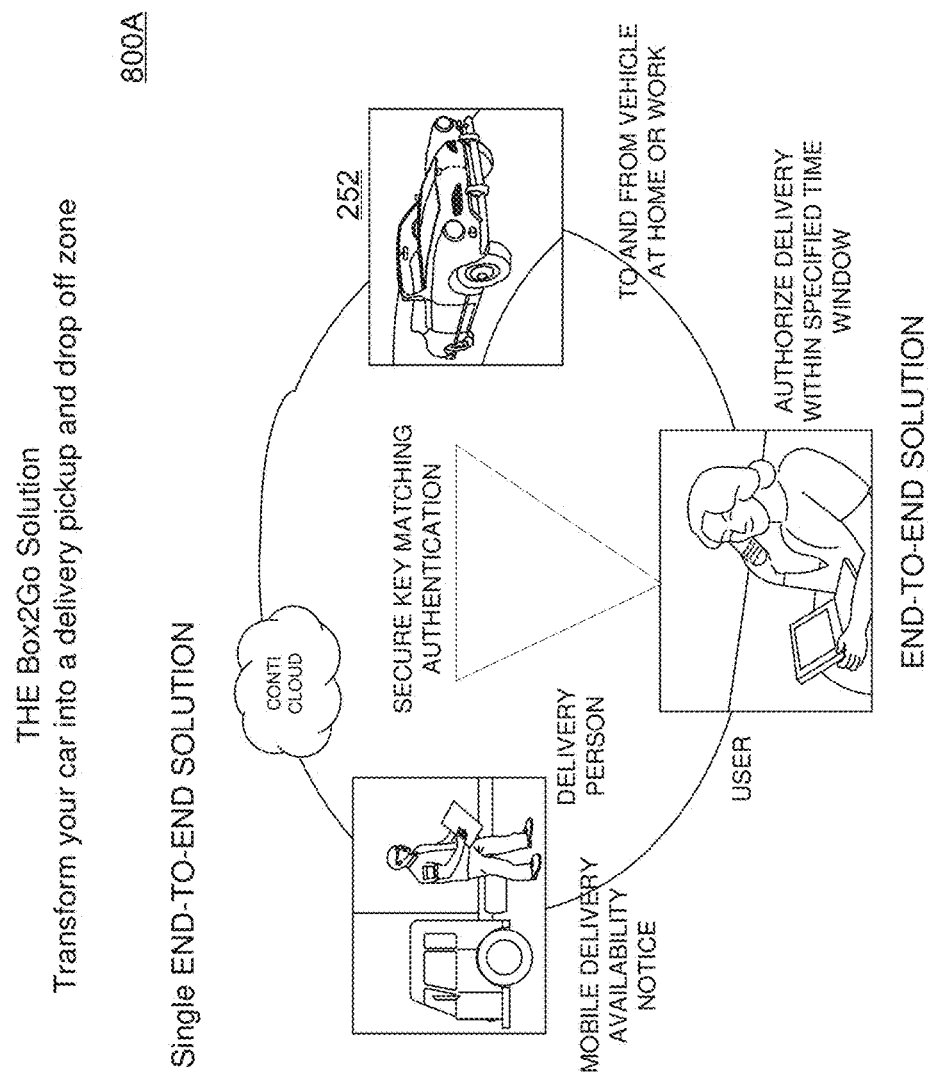
FIGS. 8A-8D illustrate block diagrams of embodiments of the multiple virtual keys used by the cloud based system for secure access.
Figure 8B:
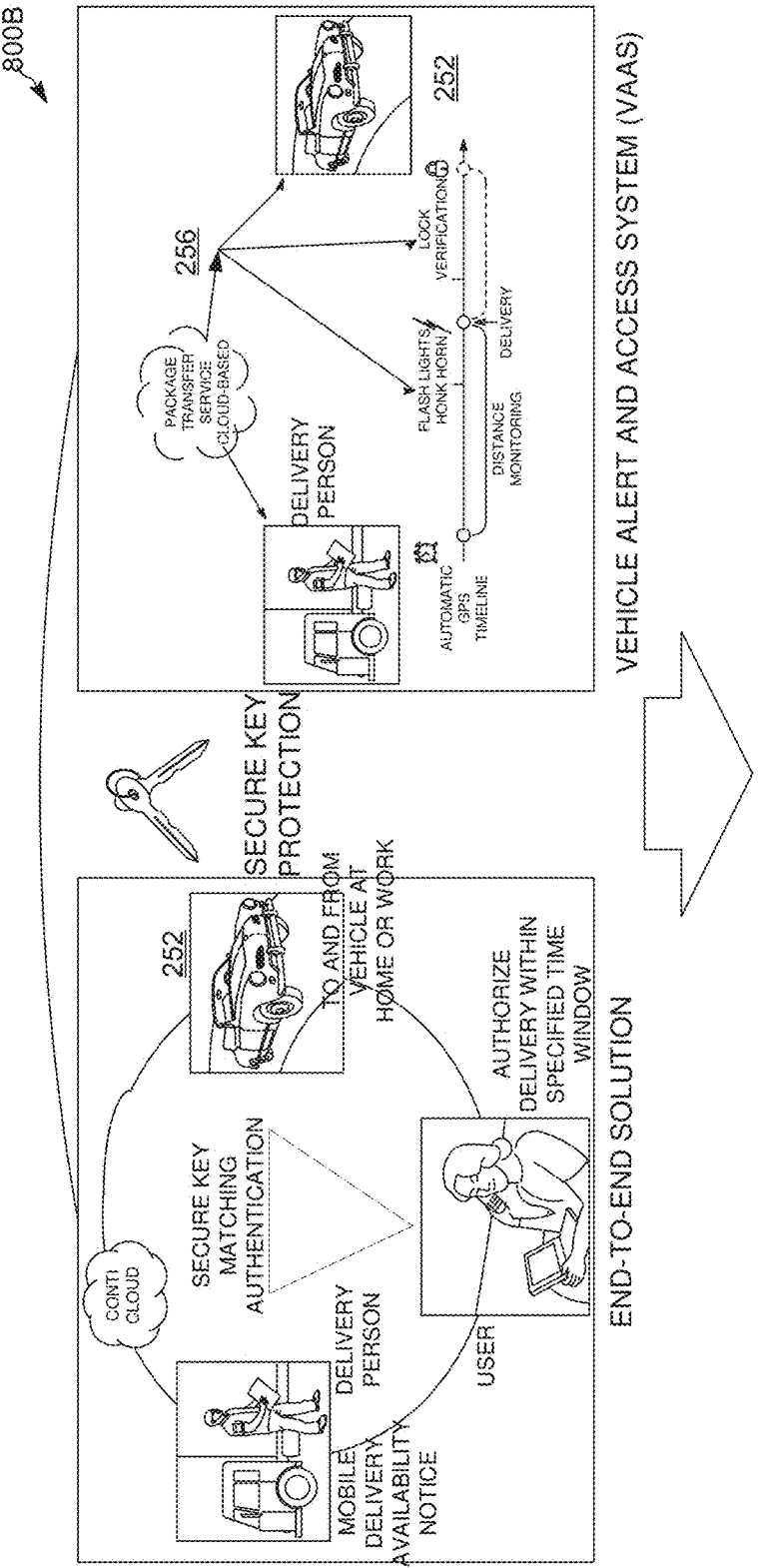
Figure 8C:
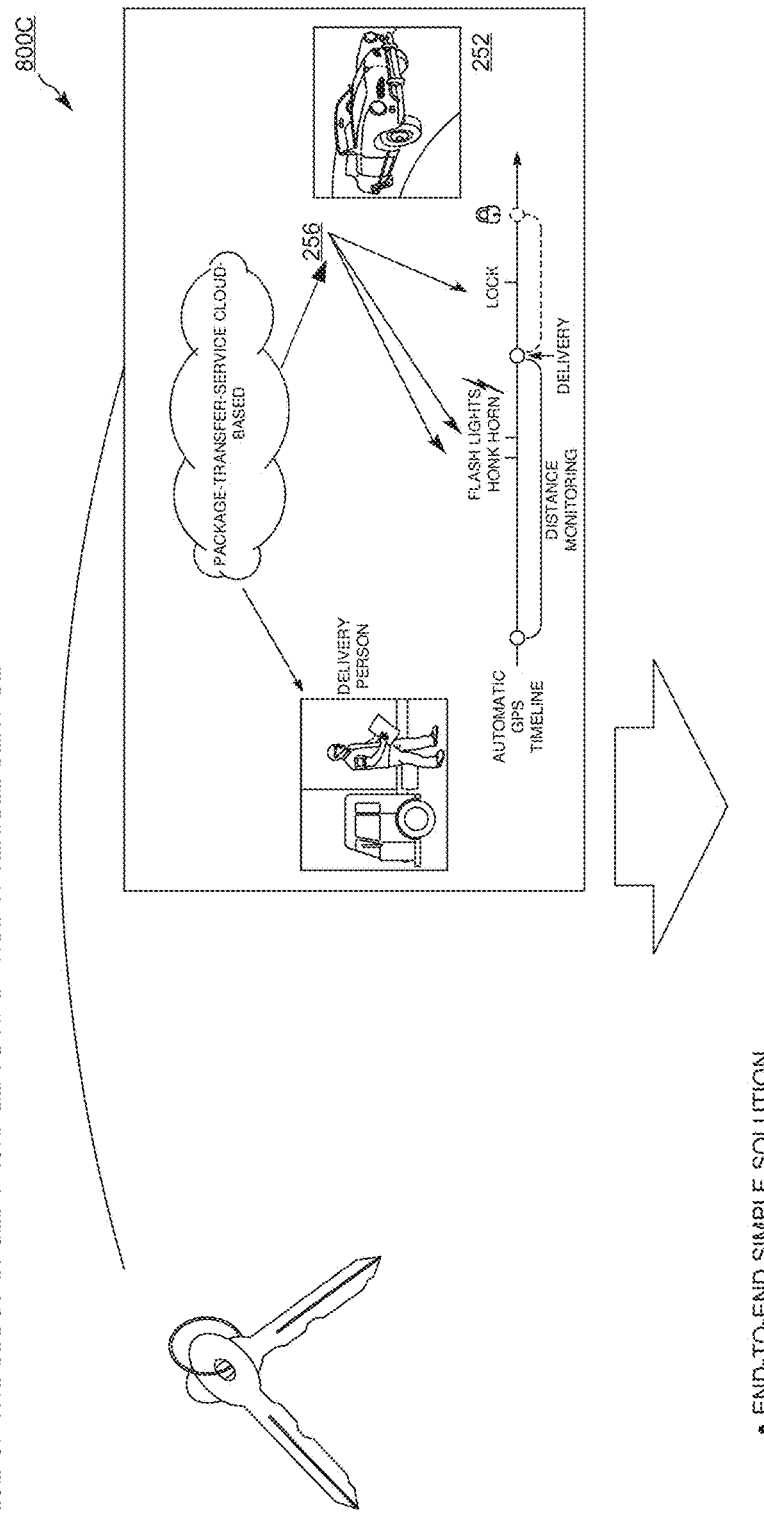
Figure 8D:
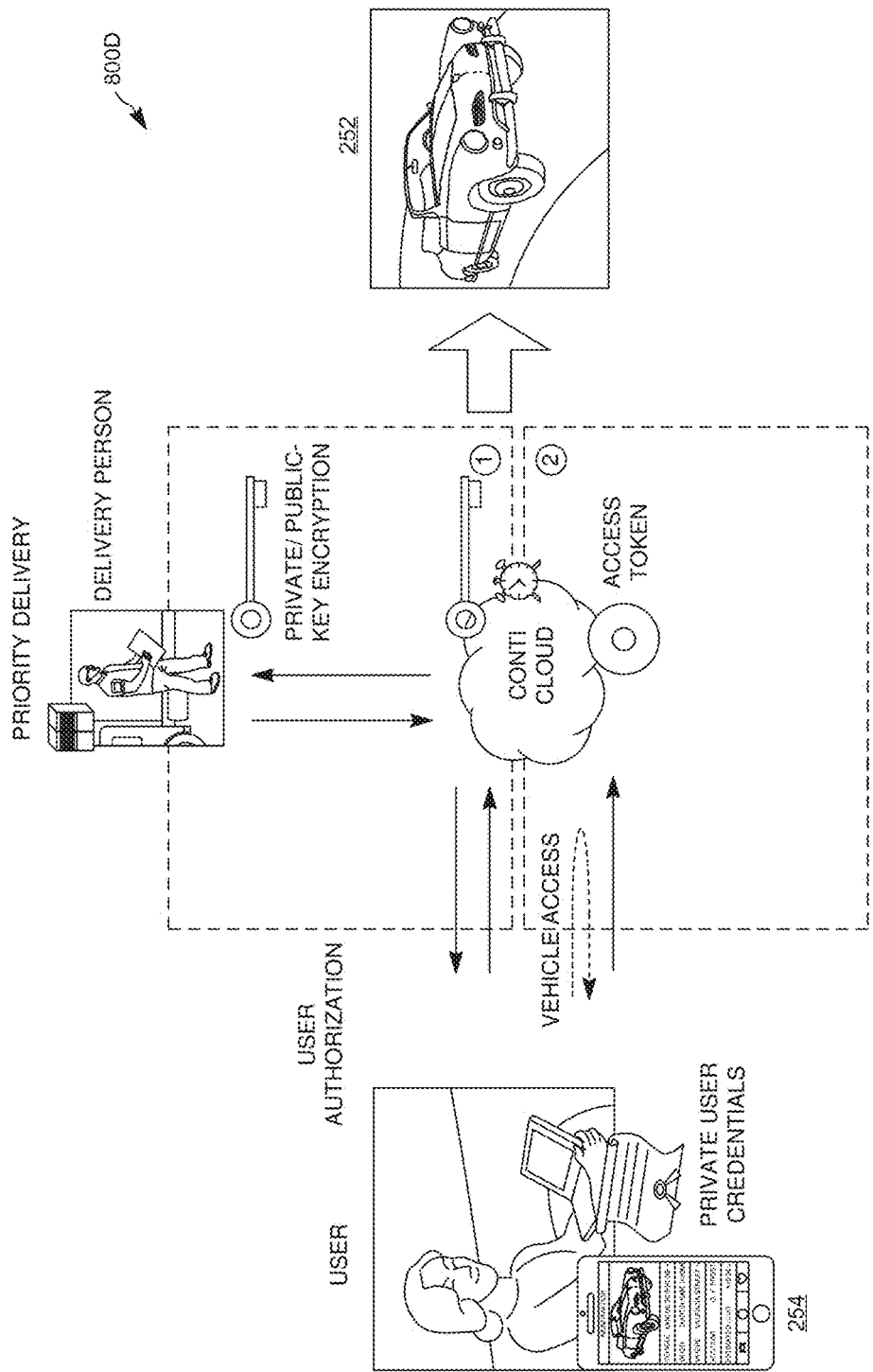

(8) The cloud based system for secure access sends the GPS coordinates of the target vehicle. Also, when the package delivery vehicle is in the vicinity of the target vehicle, the cloud based system for secure access send the next rolling security code of the target vehicle's security system to the client device of the package delivery person. (See FIGS. 7A and 7B on embodiments of the GPS-based control and tracking mechanisms used for delivery to or pick-up from the vehicle.)

(9) Optionally, the package delivery person can alert the target vehicle. Alerting includes informs one or a combination of 1) activating one or more lights of the target vehicle, 2) activating an alarm system of the target vehicle, and 3) hocking a horn of the target vehicle.

(10) Optionally, the package delivery person informs the cloud based system for secure access cloud system that the target vehicle is located.

(11) The package delivery person unlocks the car and opens a door/trunk. Unlocking includes sending a next rolling security code to the security system of the target vehicle to open one or more doors of the target vehicle, the doors include a trunk and a sunroof. Each rolling security code of the security system can be used at most once. If the already sent security code is used for alerting the car, then the next rolling security code should be obtained. In an example, the cloud based system for secure access send a predefined number or consecutive rolling codes (e.g., 10) the first time and the client device of the package delivery person uses these codes consecutively for commanding the security system of the car. Upon opening trunk/door, the package delivery person picks up or stores the package into the vehicle, and closes the door/trunk. As described, the cloud based system for secure access cloud system can monitor the distance between the package delivery vehicle and the target vehicle and prevent certain command before certain close proximities are established.

(12) After storing a package into the target vehicle (e.g., a trunk) and closing the door/trunk, the package delivery person send a command to the security system of the target vehicle and locks the vehicle. Likewise, instead of delivering a package, the delivery person can pick up a package from the target vehicle.

(13) After locking the target vehicle, the package delivery entity system's delivery person sends a delivery confirmation to the cloud based system for secure access cloud system. The package delivery entity system's delivery person sends confirmation of the package delivery/pickup and the securing of the target vehicle via the delivery application on the client's device to the cloud based system for secure access cloud system.

(14) Optionally, the package delivery entity system's delivery person sends another delivery confirmation to the package delivery entity system. Alternatively, step (13) can be automated. The delivery application on the client's device can be configured to monitor for the confirmation sent by the package delivery person to the package delivery entity system and send an automated confirmation to the cloud based system for secure access cloud system.

(15) The cloud based system for secure access cloud system sends a delivery/pickup confirmation notice to the User. In an embodiment, after receiving a confirmed delivery of the package from the delivery application in the delivery person's client device, the cloud based system for secure access cloud system instructs the delivery application of the universal key fob simulator to send the lock command to the target vehicle. In another embodiment, the GPS-based proximity control routine in the cloud based system for secure access cloud system can continue monitoring the distance between the package delivery vehicle and the target vehicle to recognize when the delivery driver is departing. The cloud based system for secure access cloud system can instruct the delivery application to send the lock command when the package delivery vehicle is departing. (16) Optionally, the package delivery entity system sends delivery/pickup confirmation email to User.

As described above, the universal key fob of the delivery person is scripted to perform multiple actions including facilitating for the electro mechanical operations in the vehicle to occur, such as unlocking/locking doors, opening/closing windows, opening and unlocking/closing and locking a trunk, opening/closing sunroof. The universal key fob of the delivery person is also scripted to send GPS coordinates of the package delivery vehicle to the cloud based system for secure access cloud system. Each of the commands that are sent to the security system of the target vehicle requires a new rolling code. In one embodiment, the rolling codes are generated by the cloud based system for secure access cloud system and a predetermined number of consecutive codes are transferred at once to the universal key fob of the delivery person.

Figure 11:
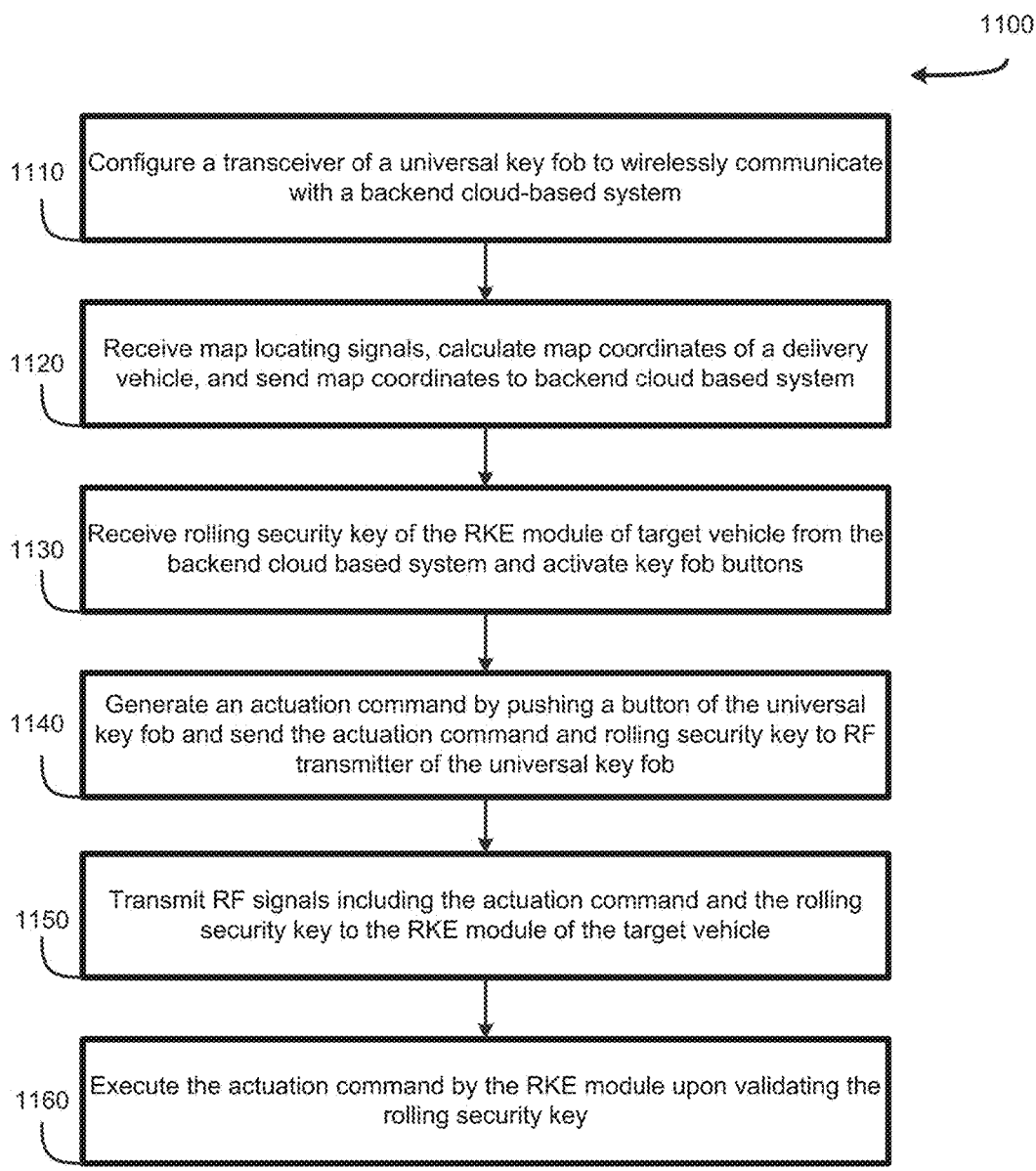
FIG. 11 illustrates a flow graph of an example method of access to a target vehicle using a key fob simulator.

FIG. 11 illustrates a flow graph of an example method of accessing a target vehicle by a universal key fob simulator. The method 1100 can be used for describing the sequence of numbered steps in diagram 300 of FIG. 3A or the flow diagrams 500, 550, 650 in FIGS. 5A, 5B, and 6B. The transceiver of a universal key fob is configured to wirelessly communicate with a backend cloud-based system (1110). In an example, the wireless communication is a cellular communication.

The map locating signals are received and map coordinates of a delivery vehicle are calculated and then the map coordinates are sent to backend cloud based system (1120). For example, as shown in FIGS. 3B-3C, current GPS coordinates of the delivery vehicle 322 are calculated. The universal key fob simulator 150 associated with delivery vehicle and installed in the delivery vehicle 322, or used as a handheld client device that travels with a delivery person 304, sends the GPS coordinates of the delivery vehicle, via cellular communication, to the backend cloud-based system. The map locating signals are received by a map-calculating circuit of the mapping module of the universal key fob simulator. The map coordinates of a delivery vehicle associated with the universal key fob simulator are calculated by the map-calculating circuit and based on the received mapping signals. The map coordinates of the delivery vehicle are sent, via the transceiver, to servers of the backend cloud based system. The map coordinates of the delivery vehicle can be stored in the memory buffers of the universal key fob simulator. In an example, the backend cloud based system can use the map coordinates of the delivery vehicle to monitor a location of the delivery vehicle.

In an example, a first delivery application of the universal key fob simulator can be downloaded from the servers of the backend cloud-based system. As an example, a second application of the client device associated with the user of the target vehicle can be downloaded from the servers of the backend cloud-based system.

In an embodiment, the current GPS coordinates of the target vehicle 252 is sent by the client device associate with the user of the target vehicle to the GPS-based proximity module of the cloud based system for secure access to a target vehicle 260.

A rolling security key of the RKE module of target vehicle is received from the backend cloud based system and the key fob buttons are activated (1130). The rolling security key is received by the security module of the universal key fob simulator, via the transceiver, from the servers of the backend cloud-based system. The servers of the backend cloud based system can send the rolling security key after the delivery vehicle reaching a pre-determined location that is in close proximity of the target vehicle. The buttons of the universal key fob simulator are not active unless the universal key fob simulator receives a valid rolling security key of the target vehicle. In an example, when each push of button uses at least one rolling security key and when all rolling security keys are used, the buttons of the universal key fob simulator become deactivated.

In an example, the buttons of the universal key fob simulator are real buttons that can physically be pushed. In another example, the buttons of the universal key fob simulator are on a user interface of an application running on the universal key fob simulator.

By pushing a button of the universal key fob, an actuation command is generated and the actuation command and rolling security key are sent to RF transmitter of the universal key fob (1140). When a user of the universal key fob simulator pushes button of the universal key fob, in response, the security module of the universal key fob simulator can generate the actuation command. Subsequently, the security module sends the actuation command and the rolling security key of the RKE module of the target vehicle to the RF transmitter of the universal key fob simulator.

The RF transmitter of the universal key fob simulator transmits RF signals including the actuation command and the rolling security key to the RKE module of the target vehicle (1150). The RF transmitter of the universal key fob simulator uses RF signals to transmit the actuation command and the rolling security key to a RF receiver associated with the RKE module of the target vehicle.

Upon validating the rolling security key by the RKE module of the target vehicle, the actuation command is then executed (1160). Examples of actuation commands are unlocking doors, opening windows, opening trunks, closing trunks, turning engine on, turning engine off, opening and closing a sunroof or moon roof.

High Level Description of the Cloud Based System for Secure Access Processes

Figure 5A:
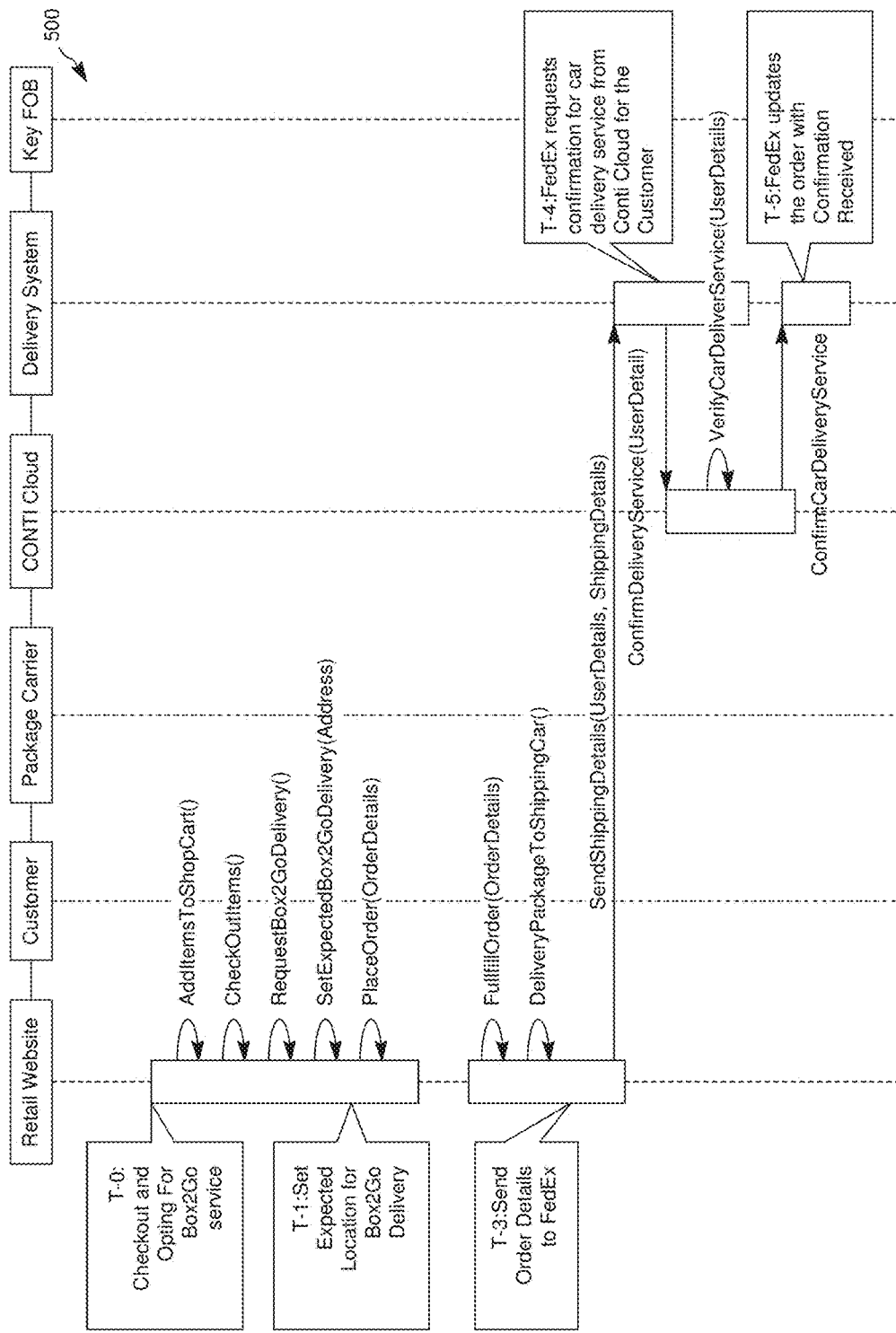
FIGS. 5A-5B illustrate flow diagrams of embodiment of the alternative delivery system.
Figure 5B:
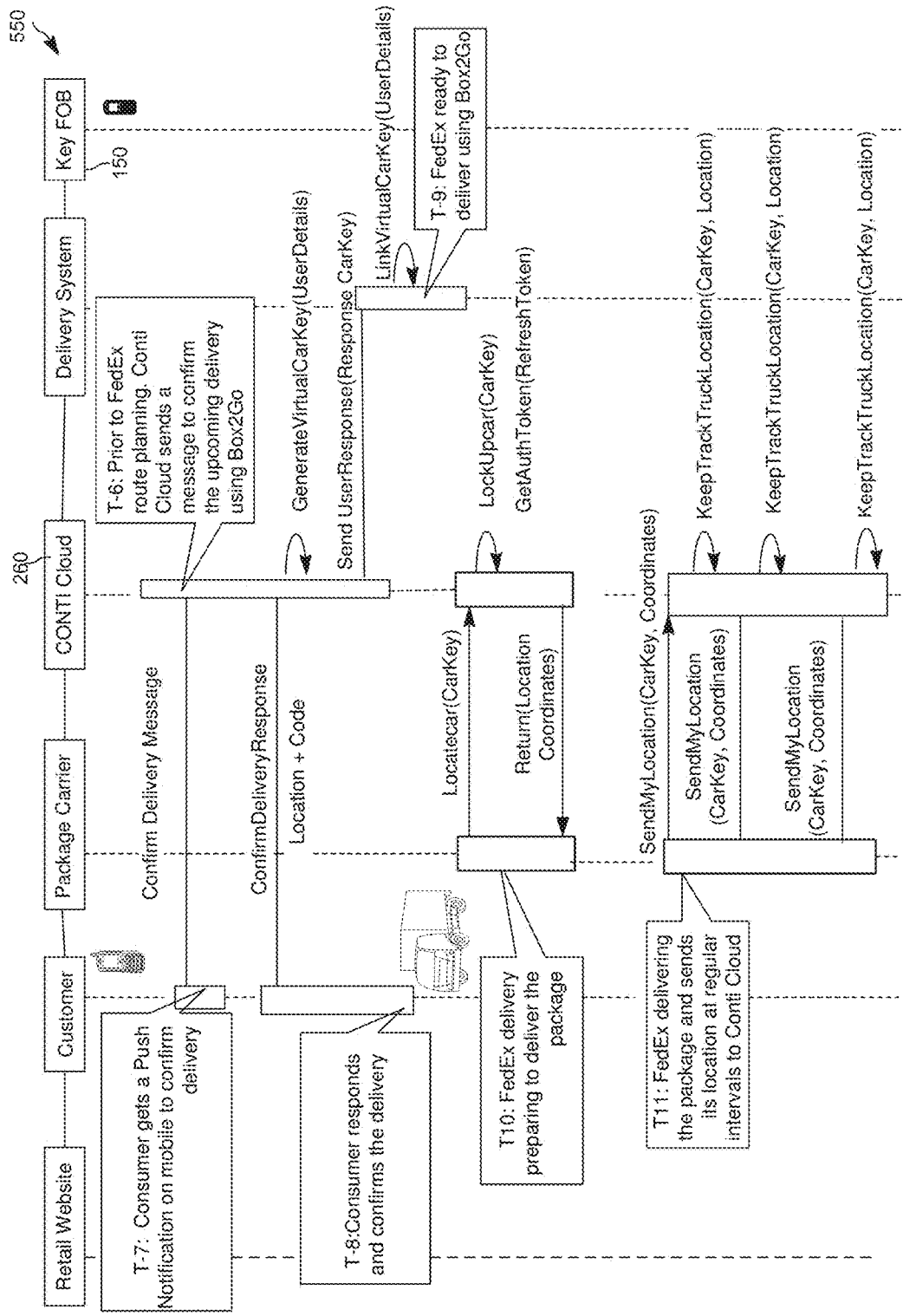
Figure 6A:
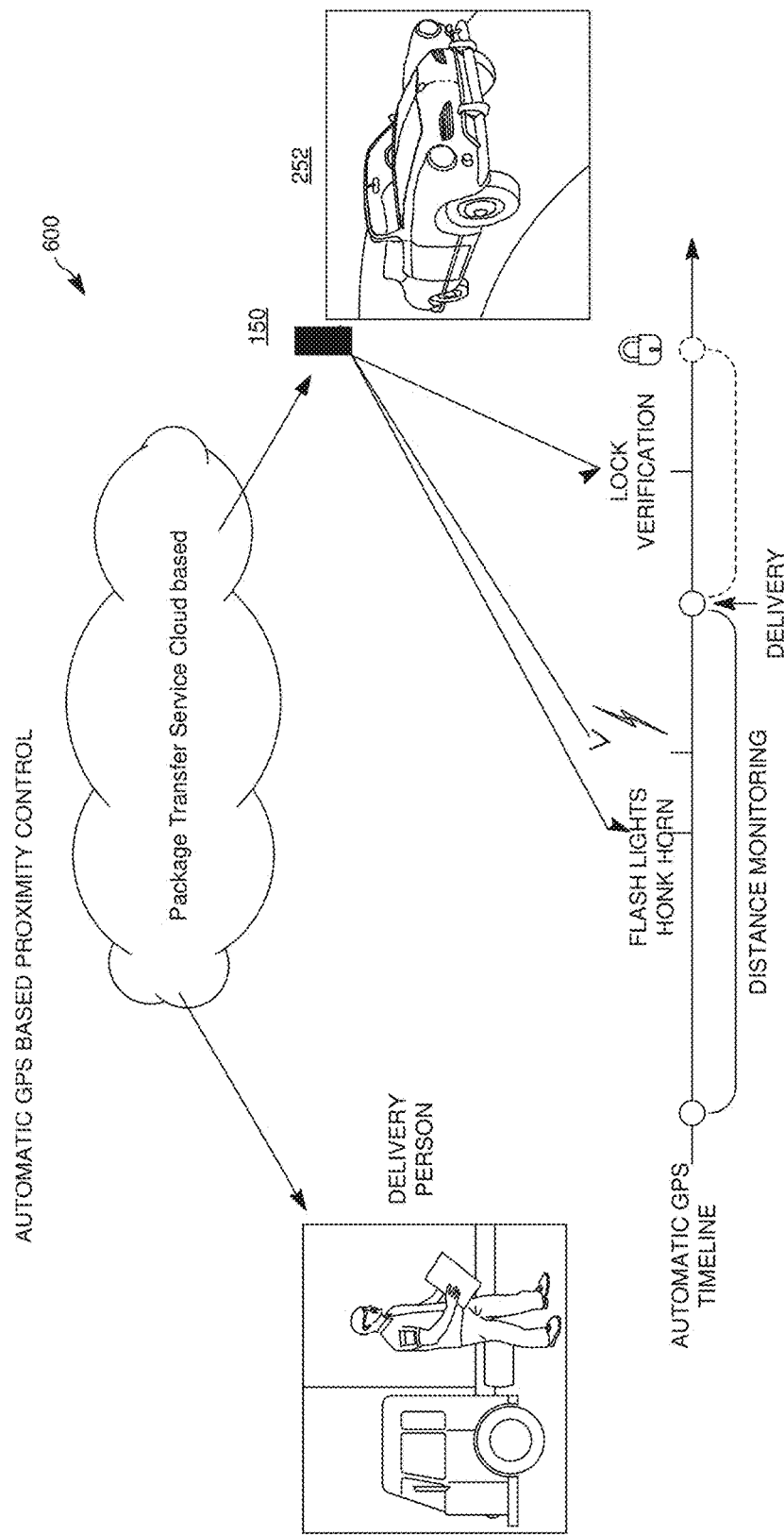
FIGS. 6A-6B illustrate block and flow diagrams of embodiments of the GPS-based control and tracking mechanisms used for delivery to or pick-up from the vehicle.
Figure 6B:
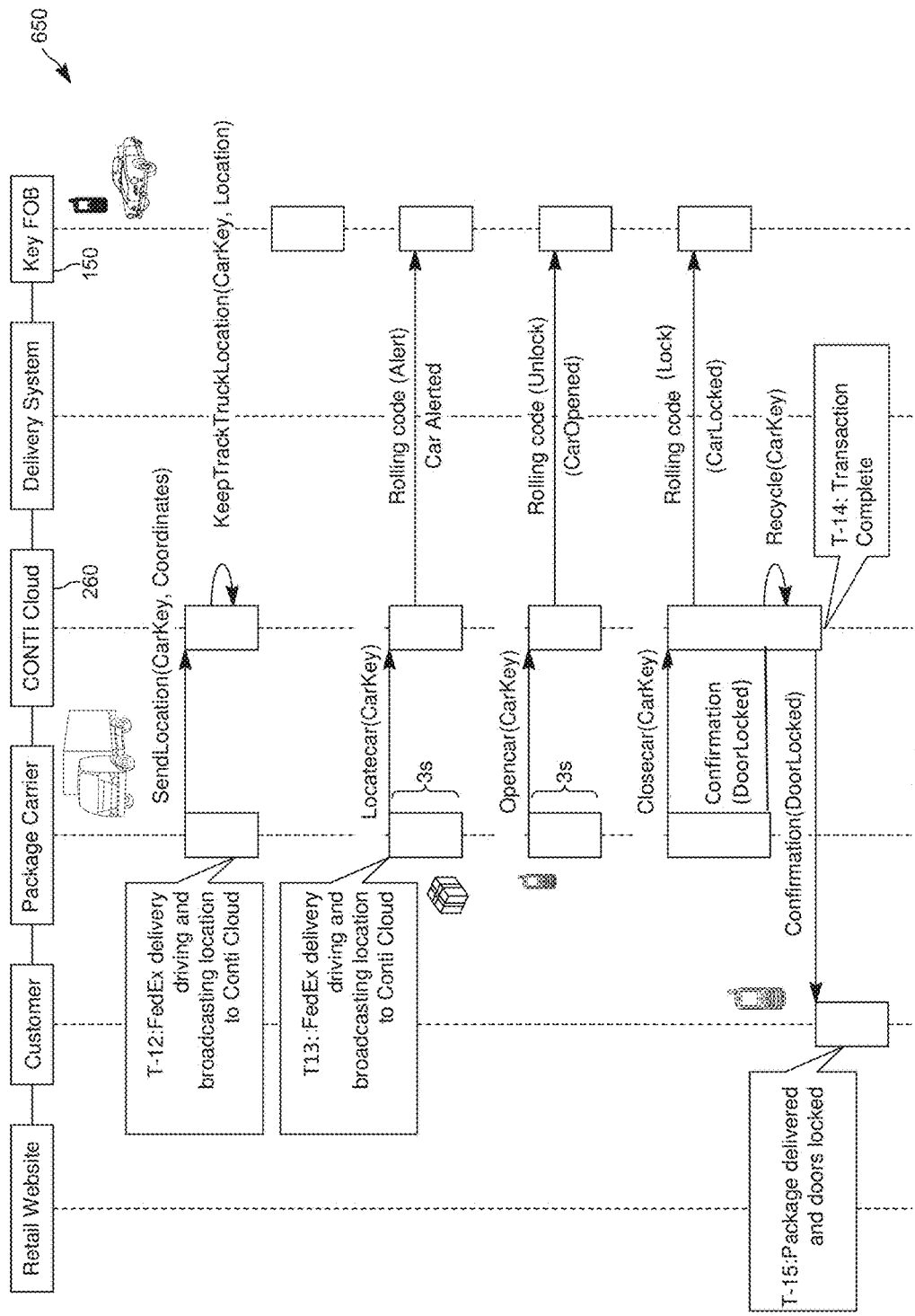

FIGS. 5A-5B illustrate flow diagrams of embodiment of the alternative delivery system.

In an embodiment, a cloud based system 260 for secure access to a target vehicle has one or more servers having one or more processors and one or more ports. The servers can cooperate with one or more cloud-based databases in the cloud based system.

In an embodiment, the cloud based system for secure access to a target vehicle has a control module that can execute on the one or more processors and can receive a first virtual key and one or more requests for granting access to the target vehicle via a first port, from a universal key fob simulator associated with a delivery vehicle. The first virtual key has a first shelf life and is stored in a first database of the cloud based system. The first virtual key is used by the control module of the cloud based system for a first authentication of communications from the universal key fob simulator.

In an embodiment, the control module of the cloud based system for secure access to a target vehicle can receive a communication from a client device associated with a user of the target vehicle. The communication can include the credentials of the user and a last activated rolling security key of the RKE module of the target vehicle. The last activated rolling security key can have a second shelf life. The credentials of the user can be used for a verification of the user and the target vehicle. The last activated rolling security key can be received from a key fob associated with the user of the target vehicle. In an example, the control module assigns the first shelf life and the second shelf life.

In an embodiment, the cloud based system for secure access to a target vehicle can have a list of registered accounts of one or more users in a second database of the one or more cloud-based databases. A first item of the list of registered accounts can include a first vehicle access data including a Make and Model of the target vehicle of the user.

In an embodiment, the cloud based system for secure access to a target vehicle can have a third database that can include algorithms and corresponding data associated with each algorithm to generate rolling security keys of the RKE modules of vehicles with different Make and Model.

Additionally, the control module of the cloud based system for secure access to a target vehicle can retrieve the first vehicle access data associated with the target vehicle of the user from the second database. The security module can also retrieve a first algorithm and a first data corresponding to the first algorithm from the third database. The servers of the cloud-based system can implement the first algorithm and use the first data to generate a next rolling security key of the target vehicle based on the last activated rolling security key.

In an embodiment, after the first authentication and in an overlap window of time between the first shelf life and the second shelf life, the control module of the cloud based system for secure access to a target vehicle can send the next rolling security key for verification, via a wireless communication, to the universal key fob simulator associated with the delivery vehicle. In an example, a security module of the universal key fob simulator associated with the delivery vehicle can to generate an actuation command in response to a button of the universal key fob simulator being pushed. The security module of the universal key fob simulator can send the actuation command and the next rolling security key to the RF signal transmitter of the universal key fob simulator. Additionally, the RF signal transmitter of the universal key fob simulator can transmit the next rolling security key and the actuation command to a Remote Keyless Entry (RKE) module of the target vehicle such that the RKE module of the target vehicle can execute the actuation command upon validating the next rolling security key.

In an embodiment, in addition to the next rolling security key the actuation command can also be received from the control module of the cloud-based system such that the universal key fob simulator can receive a complete package of rolling security code and actuation command that is then transmitted by the RF signal transmitter of the universal key fob to the RKE module of the target vehicle. As an example, generating an event on a user interface (keypad or screen) of the universal key fob such as pushing a button of the universal key fob can trigger a request for a specific actuation command from the cloud-based system.

In an embodiment, the control module of the cloud-based system 260 can include a Global Positioning System (GPS) based proximity module that is configured to execute on the processors 270 of the cloud-based system.

Additionally, the GPS-based proximity module of the cloud-based system can receive, via the second cellular communication, the current GPS coordinates of the target vehicle from the client device associated with the user. The GPS-based proximity module can also receive, via the first cellular communication, the current GPS coordinates of the delivery vehicle from the universal key fob simulator associated with the delivery vehicle. The current GPS coordinates of the delivery vehicle and the current GPS coordinates of the target vehicle can stored in the one or more cloud-based databases 275. Also, the GPS-based proximity module of the cloud-based system can use the current GPS coordinates of the delivery vehicle and the current GPS coordinates of the target vehicle to monitor a distance between the delivery vehicle and the target vehicle.

In an embodiment, a delivery person associated with the delivery vehicle can push one or more buttons of the universal key fob simulator. In response to pushing the buttons by the delivery person, the universal key fob simulator associated with the delivery vehicle can cause the security module of the universal key fob simulator to generate actuation commands related to a delivery. The actuation commands can include 1) to cause the target vehicle to give an alert via any of i) honking a horn, ii) flashing lights of the target vehicle, and iii) activating a security alarm of the target vehicle while in a close proximity established by a first threshold distance between the delivery vehicle and the target vehicle. The actuation commands can also include 2) to unlock or open a door including a trunk of the target vehicle for the service delivery person to perform one or more services while in a close proximity established by a second threshold distance between the delivery vehicle and the target vehicle. The actuation commands can also include 3) after establishing a third threshold distance between the delivery vehicle and the target vehicle, to lock the doors of the target vehicle.

In an embodiment, the cloud based system for secure access to a target vehicle 260 can includes a pool of virtual keys that includes one or more public keys and their associated private keys. The pool of virtual keys is located in at least one database of the cloud-based server. The first virtual key can be a public key from the pool of virtual keys and can be supplied by the control module of the cloud-based system 260, via a secure communication, to the universal key fob simulator associated with the package delivery vehicle 322. In an example, the first virtual key is provided by the cloud-based system to the package delivery system 302 and then the package delivery system 302 provides the first virtual key to the universal key fob simulator of the package delivery vehicle 322. Also, the universal key fob simulator of the package delivery vehicle 322 can use the first virtual key with each communication to the control module. The control module of the cloud system 260 can use the first virtual key included in the communications from the universal key fob simulator of the package delivery vehicle to authenticate the received communications. Authentication can include matching a public key with an associated private key of the pool of virtual keys. In an example, a distinct first virtual key is used for each package transfer and the virtual key is recycled or discarded after the package transfer. In another example and to tighten the security, the first virtual key can be made unique in space and time such that it is only valid in a specific window of time and in a specific location of space. For example, the first virtual key can be active only between noon and 4 p.m. on a specific day and if the package delivery vehicle is located is specific location of a city.

Registration and Purchase

There are multiple time periods and methods, described below, a customer can select to register with the cloud based system for secure access as described below. Upon registering, a first database in the one or more databases of the cloud based system for secure access cloud system may be also configured to contain and index information regarding for each user including: User ID and password for the cloud based system for secure access, User name, email, etc., security questions, vehicle VIN, vehicle model, color and year, and other similar information.

When making online purchases the following steps can be performed: i) the customer is offered to sign-up for the services of the cloud based system for secure access to a target vehicle, ii) the customer signs up for the Box2Go service application in the cloud based system for secure access to a target vehicle using an online form and the customer downloads the Box2Go mobile app into their client device, iii) the customer logs-in to the Box2Go mobile app at least once to activate the Box2Go service application in the cloud based system for secure access to a target vehicle. Next, the cloud based system for secure access to a target vehicle may automatically create a virtual key such as a public key for communication with the user. The cloud based system for secure access to a target vehicle may send the virtual key in a secure communication channel to the user. The cloud based system for secure access to a target vehicle can refresh the virtual key, e.g., after each transaction/communication and can send an encrypted key.

The shopping experience may be as follows. While shopping at a retail store, at checkout, the customer will i) purchase a product on a retail website e.g. Amazon, BestBuy, eBay, etc., ii) be offered an option on the user interface to have the purchased items delivered to his car using the Box2Go service application in the cloud based system for secure access to a target vehicle, iii) selects the delivery method as "Box2Go Delivery," to have the package delivered to the vehicle, iv) optionally, selects the expected location of the vehicle to be either work or home, and v) checks-out and places the order with the retailer. The retailer will fulfill the order and prepare the package for delivery and delivers the package with a delivery service provider like FedEx. In an example, a purchase which includes a delivery may not be an online purchase and can occur in a retail store where the Box2Go service can be selected for delivery to a vehicle.

Therefore, a user after a purchase puts in a request from the user interface from a retailer to have a package delivered to their vehicle. The online retailer sends the request to the package delivery system service provider. The package delivery system service provider sends the user's request for a package delivery to their vehicle to the cloud based system for secure access cloud system. The cloud based system for secure access cloud system looks up the user's account in a database for the cloud based system for secure access, which has following information stored and registers, the user's contact information, the make and model of the user's car(s), the VIN, as well as the license plate information. The cloud based system for secure access cloud system then sends an encrypted signal across the Internet to the mobile app resident in a client device of the user verifying that the user has indeed requested a package to be delivered to their vehicle.

The delivery service provider's Box2Go Delivery Process for use cases, described below, and includes communications via WiFi hotspots and blue tooth exchanges between an intelligent software in the vehicle itself and the downloaded application resident on the client device.

For packages marked for "Box2Go Delivery", the delivery service provider initiates a query process for the delivery of the package with the cloud based system for secure access in the cloud. The cloud based system for secure access cloud system verifies the customer information who requested the package delivery in its system and confirms that the customer has the Box2Go service application in the cloud based system for secure access to a target vehicle available to allow for such a delivery. The cloud based system for secure access cloud then sends verification back to the delivery service provider's site that the customer can accept a Box2Go delivery.

Shipping Experience and Delivery Planning

Prior to the delivery service provider's route planning, the cloud based system for secure access to a target vehicle sends a push message (preferably early in the morning) to the customer's cell phone of the Customer requesting confirmation for the vehicle delivery for the package with the Order details. The Customer confirms the vehicle delivery option by sending a message back to the cloud based system for secure access to a target vehicle. The customer may notice a push-message for Box2Go application. Once the cloud based system for secure access to a target vehicle receives the customer's confirmation for the car delivery, as a first layer of security, the cloud based system for secure access to a target vehicle will generate a virtual Car Key as the first virtual key. The cloud based system for secure access to a target vehicle sends a virtual Car Key to the delivery service provider server. The virtual Car Key is issued with a limited shelf life and will expire even if not used within a defined window of time, such as 4 hours, e.g., from noon to 4:00 pm. The virtual Car Key is included in the communications transmitted by the delivery service provider (delivery system), a client device of the package delivery vehicle, or a client device of the package delivery person to the cloud based system for secure access cloud system. As described, the virtual Car Key that can be a public key is used by the cloud based system for secure access cloud system to authenticate the received transmission through matching the public key with its associate private key.

Note, the rolling security code of the security system of the user's vehicle (target vehicle) is a second layer of security that is used for accessing the target vehicle, the second key. The two layer of security protects against if either the virtual Car key or rolling security code are compromised. After receiving the rolling code, the cloud based system for secure access cloud system can issue another shelf life such as a window of time for the rolling security code of the security system of the user's vehicle. The limited shelf life expiration protects against if BOTH the virtual Car Key and rolling security code are compromised, they are only valid for a limited window of time established by the cloud based system for secure access to a target vehicle. Thus, the security of the vehicle is protected in multiple ways. The delivery service provider system then links the virtual Car Key to the delivery order. The delivery service provider systems are then ready to execute the package delivery to the Customer's vehicle.

Pre-Deliver

The delivery service provider prepares the Box2Go package to be delivered to the customer's car. The delivery service provider plans the delivery route based on either the address selected for Box2Go delivery at the time of check-out or the current location of the vehicle. On delivery day, the delivery service provider's delivery vehicle looks up the virtual Car Key associated with the order in the Box2Go app. The delivery service provider contacts the cloud based system for secure access to a target vehicle to get the location of the car. The cloud based system for secure access to a target vehicle then receives the last known location of the car and sends it back to the delivery service provider's Box2Go app. If the current location of the vehicle is in his delivery zone, the delivery service provider's system moves ahead with the delivery. If the vehicle to deliver to is not in the delivery zone, then that delivery is skipped and marked for differed mail delivery.

Real-Time Tracking of the Delivery Service Provider's Vehicle

While tracking the delivery service provider's delivery vehicle driving toward the delivery location, the delivery application in the delivery vehicle can notify the cloud based system for secure access to a target vehicle of the delivery vehicle's location. When the delivery service provider's vehicle approaches near the car (like 100 meters), the cloud based system for secure access to a target vehicle automatically send at least one rolling security code of the security system of the target vehicle to a client device of the package delivery person. The client device of the package delivery person can transmit the code to the target vehicle to activate the security system of the target vehicle such that the target vehicle can produce an alert. This helps the delivery service provider's driver to locate the exact vehicle in a parking lot. The alert includes honking the horn, flashing some lights, or activating the hazard system of the target vehicle.

To unlock the car once delivery service provider's delivery reaches the car, the delivery application of the universal key fob of the delivery person transmits a RF signal including a next rolling security code and an Unlock command to the security system.

The delivery person places the package inside the customer's car, closes the car door/trunk, and then uses the delivery application of the universal key fob of the delivery person to transmit another RF signal including rolling security code and a lock command to the security system of the vehicle to lock the target vehicle. Alternatively, instead of placing a package the delivery person can pick up a package from inside the customer's car.

A confirmation message is sent from the package delivery person to cloud based system for secure access and to the delivery service provider's server to inform the completion of the package transfer. The customer can be notified by the cloud based system for secure access on the Box2Go app on the customer's cell phone. The delivery process is completed when the cloud based system for secure access cloud system destroys (e.g., recycles) the virtual Car Key for the order.

Revenue

FIGS. 7A-7D illustrate block and flow diagrams of embodiment of the value proposition of the alternative delivery system. As discussed above, the user/customer may pay an additional fee on a per delivery/per pick-up instance to use the cloud based system for secure access. The user/customer may pay a monthly or yearly subscription fee for all deliveries and pick-ups of packages to use the cloud based system for secure access. The user/customer may pay on another usage case model. A revenue sharing agreement may be in place between the retailer, the cloud based system for secure access and the delivery service provider. The delivery service may subsidize the delivery of packages to increase volume, make package delivery more efficient, and eliminate re-delivering of packages. For example, in a survey of United Kingdom deliveries, 12% of deliveries fails the first time. This costs the delivery industry $1.3 billion in re-deliveries per year. Advertisers may also subsidize the delivery of packages by placement of advertisements in the order placing and delivery process. Combinations of the above may be used in the revenue generating processes for using the cloud based system for secure access. The backend servers of the delivery service, the cloud based system for secure access, and retailer sites collect and distribute the compensation.

Package Pick-Up

Figure 9:
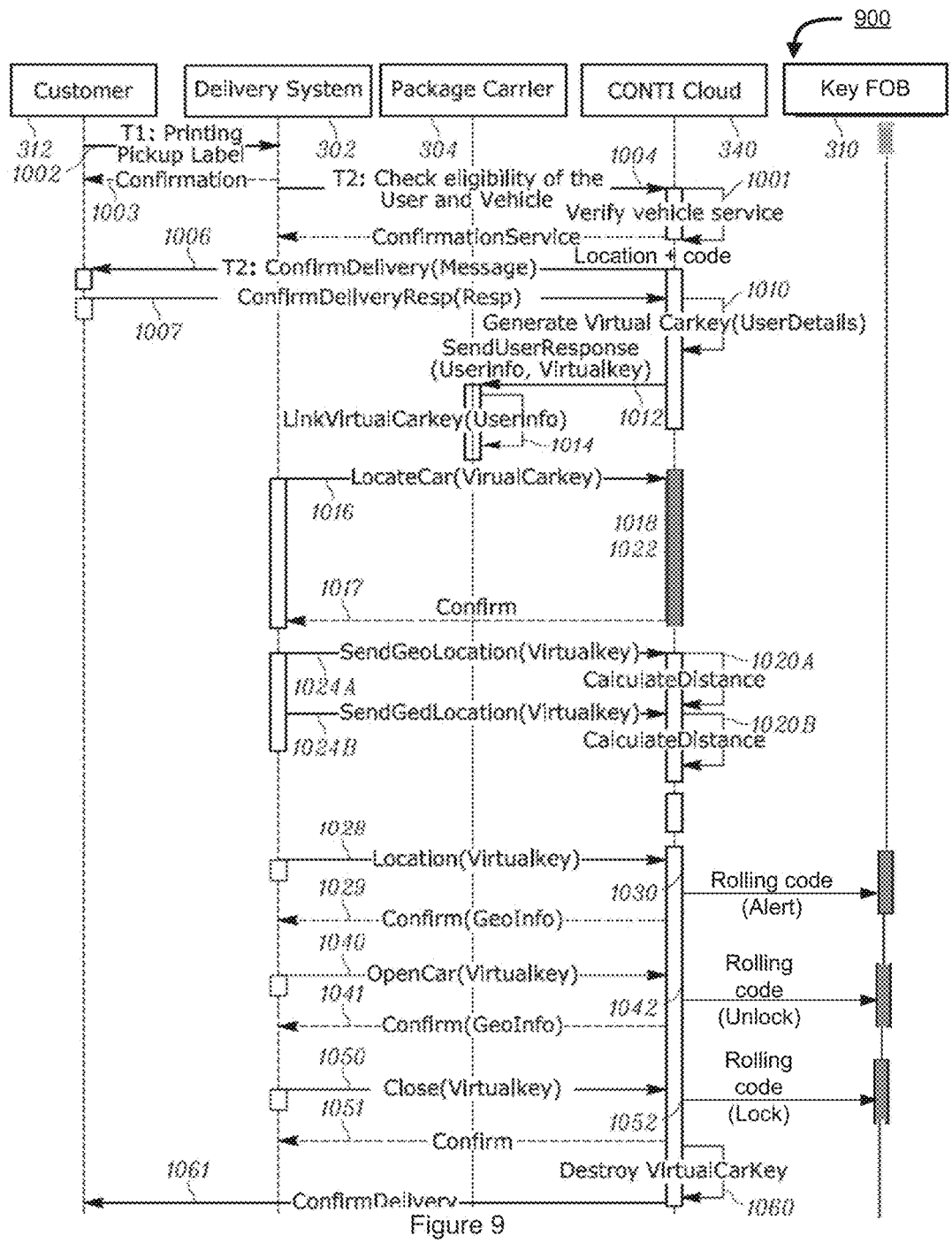
FIG. 9 illustrates a sequence diagram of embodiment of a package pick up from a user of the cloud based system for secure access.

FIG. 9 illustrates a sequence diagram of embodiment of a package pick up from a user of the cloud based system for secure access. A user of the cloud based system for secure access to a target vehicle can use the Box2Go application resident on their client device to arrange a package pickup from their vehicle. The Box2Go application resident on their client device will collect the details and send the information to the cloud based system for secure access to a target vehicle. Additionally, and/or alternatively, a package delivery service web site presents a user interface or web page to collect the details for the user to arrange a package pickup from their vehicle.

Computing System

FIG. 1 illustrates a block diagram of an example computing system that may be used in an embodiment of one or more of the servers, in-vehicle electronic modules, and client devices discussed herein. The computing system environment 800 is only one example of a suitable computing environment, such as a client device, server, in-vehicle electronic module, etc., and is not intended to suggest any limitation as to the scope of use or functionality of the design of the computing system 810. Neither should the computing environment 800 be interpreted as having any dependency or requirement relating to any one or combination of components illustrated in the exemplary operating environment 800.

With reference to FIG. 1, components of the computing system 810 may include, but are not limited to, a processing unit 820 having one or more processing cores, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus.

Computing system 810 typically includes a variety of computing machine-readable media. Computing machine-readable media can be any available media that can be accessed by computing system 810 and includes both volatile and nonvolatile media, removable and non-removable media. By way of example, and not limitation, computing machine-readable mediums uses include storage of information, such as computer readable instructions, data structures, other executable software, or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by computing device 800. However, carrier waves would not fall into a computer readable medium. Communication media typically embodies computer readable instructions, data structures, program modules, or other transport mechanism and includes any information delivery media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computing system 810, such as during start-up, is typically stored in ROM 831. RAM 832 typically contains data and/or software that are immediately accessible to and/or presently being operated on by processing unit 820. By way of example, and not limitation, FIG. 1 illustrates operating system 834, other software 836, and program data 837.

The computing system 810 may also include other removable/non-removable volatile/nonvolatile computer storage media. By way of example only, FIG. 1 illustrates a hard disk drive 841 that reads from or writes to non-removable, nonvolatile magnetic media nonvolatile optical disk 856 such as a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 1A, provide storage of computer readable instructions, data structures, other executable software, and other data for the computing system 810. In FIG. 1A, for example, hard disk drive 841 is illustrated as storing operating system 844, other software 846, and program data 847. Note that these components can either be the same as or different from operating system 834, other software 836, and program data 837. Operating system 844, other software 846, and program data 847 are given different numbers here to illustrate that, at a minimum, they are different copies.

A user may enter commands and information into the computing system 810 through input devices such as a keyboard 862, a microphone 863, a pointing device 861, such as a mouse, trackball or touch pad. The microphone 863 may cooperate with speech recognition software. These and other input devices are often connected to the processing unit 820 through a user input interface 860 that is coupled to the system bus, but may be connected by other interface and bus structures, such as a parallel port, game port or a universal serial bus (USB). A display monitor 891 or other type of display screen device is also connected to the system bus 821 via an interface, such as a video interface 890. In addition to the monitor, computing devices may also include other peripheral output devices such as speakers 897 and other output device 896, which may be connected through an output peripheral interface 890.

The computing system 810 may operate in a networked environment using logical connections to one or more remote computers/client devices, such as a remote computing device 880. The remote computing device 880 may be a personal computer, a hand-held device, a server, a router, a network PC, a peer device or other common network node, and typically includes many or all of the elements described above relative to the computing system 810. The logical connections depicted in FIG. 1 include a local area network (LAN) 871 and a wide area network (WAN) 873, but may also include other networks. Such networking environments are commonplace in offices, enterprise-wide computer networks, intranets and the Internet. A browser application may be resident on the computing device and stored in the memory.

When used in a LAN networking environment, the computing system 810 is connected to the LAN 871 through a network interface or adapter 870. When used in a WAN networking environment, the computing system 810 typically includes a modem 872 or other means for establishing communications over the WAN 873, such as the Internet. The modem 872, which may be internal or external, may be connected to the system bus 821 via the user-input interface 860, or other appropriate mechanism. In a networked environment, other software depicted relative to the computing system 810, or portions thereof, may be stored in the remote memory storage device. By way of example, and not limitation, FIG. 1 illustrates remote application programs 885 as residing on remote computing device 880. It will be appreciated that the network connections shown are exemplary and other means of establishing a communications link between the computing devices may be used.

As discussed, the computing system may include a processor, a memory, a built in battery to power the computing device, an AC power input, potentially a built-in video camera, a display screen, and a built-in Wi-Fi circuitry to wirelessly communicate with a remote computing device connected to network.

It should be noted that the present design can be carried out on a computing system such as that described with respect to FIG. 1. However, the present design can be carried out on a server, a computing device devoted to message handling, or on a distributed system in which different portions of the present design are carried out on different parts of the distributed computing system.

Another device that may be coupled to bus 811 is a power supply such as a battery and Alternating Current adapter circuit. As discussed above, the DC power supply may be a battery, a fuel cell, or similar DC power source that needs to be recharged on a periodic basis. The wireless communication module 872 may employ a Wireless Application Protocol to establish a wireless communication channel. The wireless communication module 872 may implement a wireless networking standard such as Institute of Electrical and Electronics Engineers (IEEE) 802.11 standard, IEEE std. 802.11-1999, published by IEEE in 1999.

Examples of mobile computing devices may be a laptop computer, a cell phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

Vehicle's Intelligent Transport Systems to Integrate with a Connected Network Environment A vehicle has hardware and software that can take control of the vehicle for a short period including activating electromechanical mechanisms that are part of the vehicle. The vehicle can have hardware and software for networking between the cloud as well as potentially between other vehicles to cause related automation within the vehicle based on communications between the vehicle and the cloud and/or other vehicles. The vehicle's Cellular Interface system is configured to allow cellular phones access the automobile computer systems, interpret the information and show the text on the cellular phones display while simultaneously transmitting the retrieved information, as well as characteristic and states of the cellular phone used to access the vehicle computer system, to a global network that would alert parties who could assist or benefit from the retrieved automobile information. In an embodiment, a cellular phone with a software application can wirelessly establish a connection with the vehicle's on-board diagnostic computer and/or other on-board intelligent control systems. In an example, the user's fob can receive the GPS coordinates from the target vehicle using the Cellular Interface system.

The system can interface with a client device, such as a mobile phone, with the on-board computing system in the vehicle. The on-board diagnostic computing device may monitor a set of operational characteristics of a vehicle and store or communicate that diagnostic to both the driver and with the cloud. The information derived from this system can also be conveyed and processed on a mobile client device coupled with additional information and displayed on the mobile client device's display screen, while simultaneously transmitting this information over the Internet to be stored in a database. Alternatively, the vehicle may not have hardware and software for networking and can only store the diagnostic data. A client device such as a mobile phone can be configured to interface diagnostic system of the car and retrieve the stored data. Additionally, the client device may send commands through the diagnostic system of the vehicle. As an example, Bluetooth can be used as the interface between the client device of the user and the on-board computing system At the point of communication negotiation, an application on the client device can extract position location from the vehicle's navigation system and transmits the response from the vehicle's navigation system and the location to a server such as a server of the cloud based system for secure access cloud system ready to receive this information. Alternatively, an application can extract similar position information from GPS module internal to the client device itself.

In an embodiment, the standard for the automotive industry for vehicles may use is the SAE J1850 communications protocol, which utilizes variable pulse width modulation and pulse width modulation. This means that the width of the pulse determines whether it is a 1 or a 0. Most phones form communication with serial connections (RS-232, Infrared . . . etc.) and wireless connection protocols (Bluetooth, Infrared . . . etc.). These two protocols must be converted or bridged by some sort of microprocessor so the two communication methodologies can communicate with each other. This can be accomplished by using an integrated circuit that can be used to convert the OBD-II signal (which includes different protocols such as, but not limited to: J1850 VPW, J1850 PWM, ISO 9141-2, ISO 14230, ISO 15765) to one of the aforementioned phone communication formats.

Network Environment

Figure 2A:
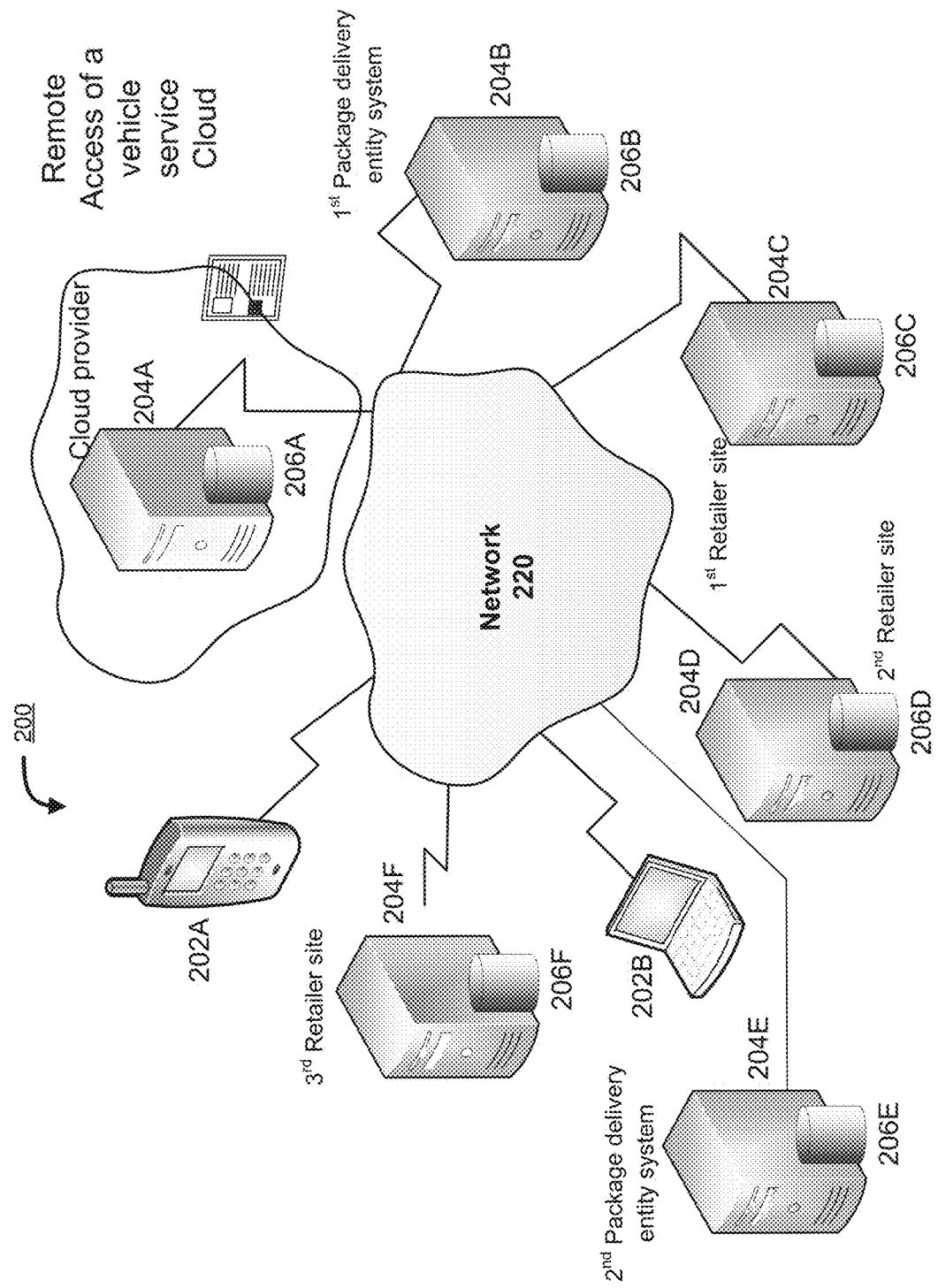
FIGS. 2A-2C illustrate block diagrams of embodiments of the cloud based system for secure access hosted on a cloud-based provider site.
Figure 2B:
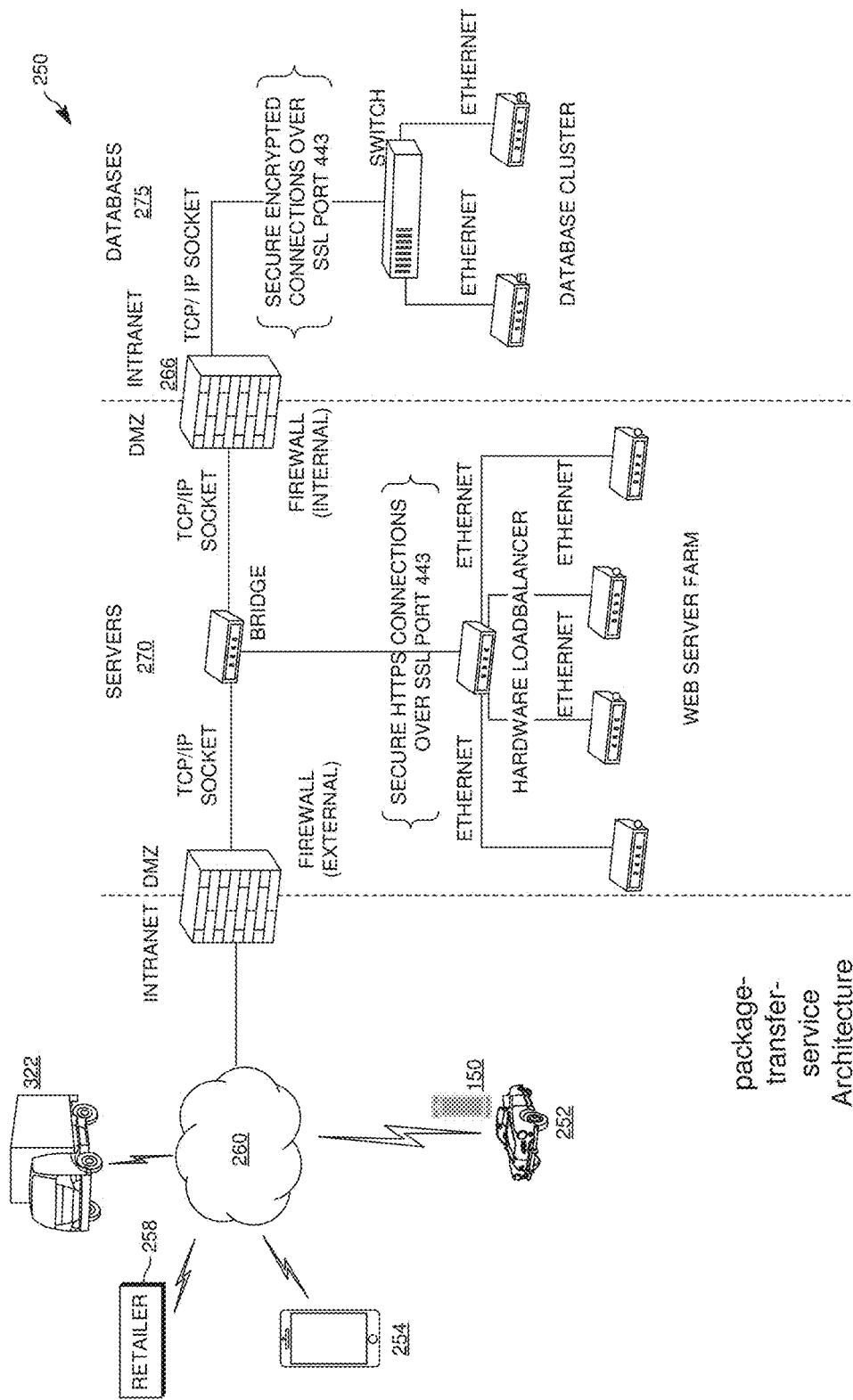

FIGS. 2A-2B illustrate block diagrams of embodiments of the cloud based system for secure access hosted on a cloud-based provider site. i) A user downloads and uses either i) a vehicle package delivery/pickup mobile application or ii) a vehicle package delivery/pickup desktop application on their client device to register with the cloud based system for secure access to a target vehicle 252. The cloud based system for secure access to a target vehicle hosted on a cloud-based provider site contains one or more servers and one or more databases, for example, 4 servers and 2 database clusters. The one or more databases store at least i) User ID and Password for the cloud based system for secure access, ii) User name, iii) email or contact phone number of the user, iv) Security questions, v) Vehicle VIN, vi) Vehicle make, model, color, year, and vii) any combination of at least three of these.

FIG. 2A illustrates diagrams of a network environment in which the techniques described may be applied. The network environment 200 has a communications network 220 that connects server computing systems 204A through 204F, and at least one or more client computing systems 202A, 202B. As shown, there may be many server computing systems 204A through 204F and many client computing systems 202A through 202B connected to each other via the network 220, which may be, for example, the Internet. Note, that alternatively the network 220 might be or include one or more of: an optical network, the Internet, a Local Area Network (LAN), Wide Area Network (WAN), satellite link, fiber network, cable network, or a combination of these and/or others. It is to be further appreciated that the use of the terms client computing system and server computing system is for clarity in specifying who generally initiates a communication (the client computing system) and who responds (the server computing system). No hierarchy is implied unless explicitly stated. Both functions may be in a single communicating device, in which case the client-server and server-client relationship may be viewed as peer-to-peer. Thus, if two systems such as the client computing system 202A and the server computing system 204A can both initiate and respond to communications, their communication may be viewed as peer-to-peer. Likewise, communications between the client computing systems 204A and 204B, and the server computing systems 202A and 202B may be viewed as peer-to-peer if each such communicating device is capable of initiation and response to communication. Additionally, server computing systems 204A-204F also have circuitry and software to communication with each other across the network 220. One or more of the server computing systems 204A to 204F may be associated with a database such as, for example, the databases 206A to 206F. Each server may have one or more instances of a virtual server running on that physical server and multiple virtual instances may be implemented by the design. A firewall may be established between a client computing system 202A and the network 220 to protect data integrity on the client computing system 202A. Each server computing system 204A-204F may have one or more firewalls.

Figure 2C:
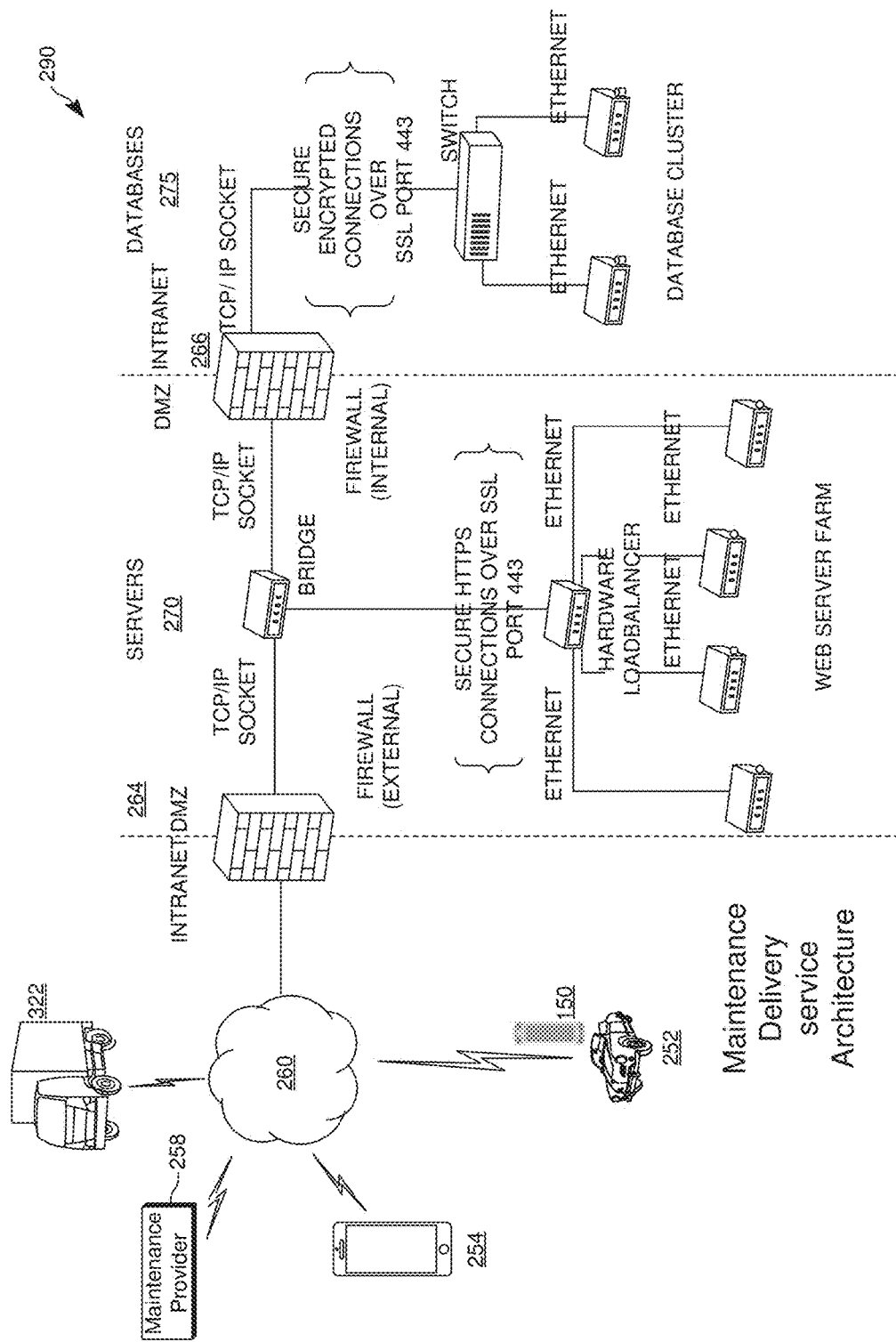

FIGS. 2A-2C illustrate block diagrams of an embodiment of a cloud-based system for secure access to a target vehicle hosted on the cloud-based provider site that automates a package delivery to, pick up from the vehicle, or performing a maintenance process. The cloud-based system for secure access to a target is hosted on a cloud-based provider site that contains one or more servers and one or more databases.

A cloud provider service can install and operate application software in the cloud and users can access the software service from the client devices. Cloud users who have a site in the cloud may not solely manage the cloud infrastructure and platform where the application runs. Thus, the servers and databases may be shared hardware where the user is given a certain amount of dedicate use of these resources. The user's cloud-based site is given a virtual amount of dedicated space and bandwidth in the cloud. Cloud applications can be different from other applications in their scalability which can be achieved by cloning tasks onto multiple virtual machines at run-time to meet changing work demand. Load balancers distribute the work over the set of virtual machines. This process is transparent to the cloud user, who sees only a single access point.

The cloud based system for secure access to a target vehicle is coded to utilize a protocol, such as Hypertext Transfer Protocol (HTTP), to engage in a request and response cycle with both a mobile device application resident on a client device as well as a web-browser application resident on the client device. The cloud based system for secure access to a target vehicle has one or more routines to automate a package delivery to and pick up from the vehicle process. The cloud based system for secure access to a target vehicle can be accessed by a mobile device, a desktop, a tablet device and other similar devices, anytime, anywhere. Thus, the cloud based system for secure access to a target vehicle hosted on a cloud-based provider site is coded to engage in 1) the request and response cycle from all web browser based applications, 2) SMS/twitter based request and response message exchanges, 3) the request and response cycle from a dedicated on-line server, 4) the request and response cycle directly between a native mobile application resident on a client device and the cloud based system for secure access to a target vehicle, and 5) combinations of these.

The cloud based system for secure access to a target vehicle has one or more application programming interfaces (APIs) with two or more of the package delivery entity sites, such as FedEx, UPS, etc. The APIs may also be an open source API. One or more of the API's may be customized to closed/non-published APIs of a remote access/connectivity' site and/or package delivery entity site. The cloud-based system-for-geo-proximity-access is coded to establish a secure communication link between each package delivery entity site and the cloud provider site. The software service is coded to establish the secure communication link by creating a tunnel at the socket layer and encrypting any data while in transit between each package delivery entity sites and the provider site as well as to satisfy any additional authentication mechanisms required by the direct lending institution, including but not limited to IP address white listing and token based authentication.

In an embodiment, the server computing system 204 may include a server engine, a web page management component, a content management component, and a database management component. The server engine performs basic processing and operating system level tasks. The web page management component handles creation and display or routing of web pages or screens associated with receiving and providing digital content and digital advertisements. Users may access the server-computing device by means of a URL associated therewith. The content management component handles most of the functions in the embodiments described herein. The database management component includes storage and retrieval tasks with respect to the database, queries to the database, and storage of data.

An embodiment of a server computing system to display information, such as a web page, etc. is discussed. An application including any program modules, when executed on the server computing system 204A, causes the server computing system 204A to display windows and user interface screens on a portion of a media space, such as a web page. A user via a browser from the client computing system 202A may interact with the web page, and then supply input to the query/fields and/or service presented by a user interface of the application. The web page may be served by a web server computing system 204A on any Hypertext Markup Language (HTML) or Wireless Access Protocol (WAP) enabled client computing system 202A or any equivalent thereof. For example, the client mobile computing system 202A may be a smart phone, a touch pad, a laptop, a netbook, etc. The client computing system 202A may host a browser to interact with the server computing system 204A. Each application has a code scripted to perform the functions that the software component is coded to carry out such as presenting fields and icons to take details of desired information. Algorithms, routines, and engines within the server computing system 204A take the information from the presenting fields and icons and put that information into an appropriate storage medium such as a database. A comparison wizard is scripted to refer to a database and make use of such data. The applications may be hosted on the server computing system 204A and served to the browser of the client computing system 202A. The applications then serve pages that allow entry of details and further pages that allow entry of more details.

Wireless System

A wireless communication circuit exchanges communication between the mobile client device and the vehicle. The wireless communication circuit executes instructions with the processor via a bus system. The wireless communication circuit can be configured to communicate to RF (radio frequency), satellites, cellular phones (analog or digital), Bluetooth®V, Wi-Fi, Infrared, Zigby, Local Area Networks (LAN), WLAN (Wireless Local Area Network), or other wireless communication configurations and standards. The wireless communication circuit allows the vehicle's intelligence systems such as diagnostic tools to communicate with other devices wirelessly. The wireless communication circuit includes an antenna built therein and being housed within the housing or can be externally located on the housing.

The Telecommunications and Informatics applied in wireless technologies and computational systems may be based on 802.11p. The IEEE standard in the 802.11 family and also referred to as Wireless Access for the Vehicular Environment (WAVE), is the primary standard that addresses and enhances Intelligent Transportation System.

Additional intelligent vehicle technologies are car safety systems and self-contained autonomous electromechanical sensors to generate warnings that can be transmitted within a specified targeted area of interest, say within 100 meters of the emergency warning system for vehicles transceiver. In ground applications, intelligent vehicle technologies are utilized for safety and commercial communications between vehicles or between a vehicle and a sensor along the road.

The wireless communication circuits in the vehicle or in a client device are configured to give access to the mobile Internet via a cellular telephone service provider. The mobile Internet is wireless access that handoffs the mobile client device or vehicle from one radio tower to another radio tower while the vehicle or device is moving across the service area. Also, in some instances Wi-Fi may be available for users on the move so that a wireless base station connects directly to an Internet service provider, rather than through the telephone system.

Scripted Code

In regards of viewing ability of an on-line site: the scripted code for the on-line site, such as a website, social media site, etc., is configured to adapted to be i) viewed on tablets and mobile phones, such as individual downloadable applications in data stores that are designed to interface with the on-line site, ii) viewable on a screen in the vehicle, as well as iii) viewable on a screen of a desktop computer via a browser. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like.

Mobile web applications and native applications can be downloaded from a cloud-based site. The mobile web applications and native applications have direct access to the hardware of mobile devices (including accelerometers and GPS chips), and the speed and abilities of browser-based applications. Information about the mobile phone and the vehicle's location is gathered by software housed on the phone.

One or more scripted routines for the cloud based system for secure access to a target vehicle are configured to collect and provide features such as those described herein.

Any application and other scripted code components may be stored on a non-transitory computing machine-readable medium which, when executed on the server causes the server to perform those functions. The applications including program modules may be implemented as logical sequences of software code, hardware logic circuits, and any combination of the two, and portions of the application scripted in software code are stored in a non-transitory computing device readable medium in an executable format. In an embodiment, the hardware logic consists of electronic circuits that follow the rules of Boolean Logic, software that contain patterns of instructions, or any combination of both.

The design is also described in the general context of computing device executable instructions, such as applications etc. being executed by a computing device. Generally, programs include routines, objects, widgets, plug-ins, and other similar structures that perform particular tasks or implement particular abstract data types. Those skilled in the art can implement the description and/or figures herein as computer-executable instructions, which can be embodied on any form of computing machine-readable media discussed herein.

Some portions of the detailed descriptions herein are presented in terms of algorithms/routines and symbolic representations of operations on data bits within a computer memory. These algorithmic descriptions and representations are the means used by those skilled in the data processing arts to most effectively convey the substance of their work to others skilled in the art. An algorithm/routine is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms/routine of the application including the program modules may be written in a number of different software programming languages such as C, C++, Java, HTML, or other similar languages.

Many online pages on a server, such as web pages, are written using the same language, Hypertext Markup Language (HTML), which is passed around using a common protocol—HTTP. HTTP is the common Internet language (dialect, or specification). Through the use of a web browser, a special piece of software that interprets HTTP and renders HTML into a human-readable form, web pages authored in HTML on any type of computer can be read anywhere, including telephones, PDAs and even popular games consoles. Because of HTTP, a client machine (like your computer) knows that it has to be the one to initiate a request for a web page; it sends this request to a server. A server may be a computing device where web sites reside—when you type a web address into your browser, a server receives your request, finds the web page you want, and sends it back to your desktop or mobile computing device to be displayed in your web browser. The client device and server may bilaterally communicate via a HTTP request & response cycle between the two.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computing system, or similar electronic computing device, that manipulates and transforms data represented as physical (electronic) quantities within the computing system's registers and memories into other data similarly represented as physical quantities within the computing system memories or registers, or other such information storage, transmission or display devices.

Although embodiments of this design have been fully described with reference to the accompanying drawings, it is to be noted that various changes and modifications will become apparent to those skilled in the art. The key fob simulator may be used in Services other than package exchange with a vehicle such as vehicle maintenance services performed at a parking lot at work, ride sharing implementations, etc. Upon proper verification, authorization, and with the security measures discussed herein, the backend server will send the rolling code to the key fob simulator to open or unlock the target vehicle. Such changes and modifications are to be understood as being included within the scope of embodiments of this design as defined by the appended claims. The invention is to be understood as not limited by the specific embodiments described herein, but only by scope of the appended claims.

What is claimed is:

1. A universal key fob simulator for sending actuation commands to a target vehicle, the universal key fob simulator comprising:
    one or more memory buffers;
    one or more processors configured to either directly calculate a rolling security key code particular for the target vehicle or assist in processing the actuation commands containing one or more generated rolling security key codes particular for the target vehicle;
    a transceiver configured to use wireless communications to communicate with a backend cloud-based system;
    a Radio Frequency (RF) transmitter that has one or more Application Specific Integrated Circuits to be highly configurable in generating a set of two or more stable RF signals at different frequency wavelengths in order to transmit RF signals of a command to a Remote Keyless Entry (RKE) module of the target vehicle;
    a mapping module having a map-calculating circuit and configured to receive map locating signals and to calculate map coordinates of a delivery vehicle associated with the universal key fob simulator, and to store the map coordinates of the delivery vehicle in the one or more memory buffers, where the mapping module is configured to send the map coordinates of the delivery vehicle, via the transceiver, to servers of the backend cloud based system, where a mapping algorithm in the backend cloud-based system is configured to use the map coordinates of the delivery vehicle to monitor a geographic location of the delivery vehicle as well as understand a geographic location of the target vehicle;
    a security module configured to receive, via the transceiver, the one or more rolling security keys of the RKE module of the target vehicle from the servers of the backend cloud based system after the delivery vehicle reaches a pre-determined distance between the geographical location of the delivery vehicle relative to the geographic location of the target vehicle;
    one or more physical or software buttons configured to be pushed by a user of the universal key fob simulator, where the buttons of the universal key fob simulator are configured to be activated after receiving at least one rolling security key of the RKE module of the target vehicle from the servers of the backend cloud based system;
    wherein in response to pushing a first button of the universal key fob simulator, the security module is also configured to generate a first actuation command for an electro mechanical operation in the target vehicle, where the security module is configured to send the first actuation command and a first rolling security key of the target vehicle to the RKE module of the target vehicle by commanding the RF transmitter to transmit at the RF frequency of the target vehicle RF signals including the first actuation command and the first rolling security key to the RKE module of the target vehicle; and
    wherein the RKE module of the target vehicle is then configured to execute the first actuation command to cause the electro mechanical operation in the target vehicle after validating the rolling security key.

2. The universal key fob simulator of claim 1, wherein the security module is configured to receive a first algorithm and a first data from the servers of the backend cloud-based system, where the first algorithm is configured to be implemented in a first routine of the security module that is configured to be executed on the one or more processors, the first algorithm is configured to use the first data to determine a valid rolling security key of the RKE module of the target vehicle, and to store the one or more rolling security keys of the RKE module of the target vehicle in the one or more memory buffers.

3. The universal key fob simulator of claim 1, wherein the security module is configured to receive the one or more rolling security keys after establishing a close proximity by a threshold distance between the package delivery vehicle and the target vehicle such that the actuation commands are executed only after establishing the close proximity by a threshold distance; and
    wherein the security module is configured to generate actuation commands in response to pushing the buttons of the universal key fob simulator, where the actuation commands include one or more electro mechanical operations of unlocking doors, opening windows, opening trunks, closing trunks, turning engine on, turning engine off, opening or closing a sunroof, in the target vehicle.

4. The universal key fob simulator of claim 1, wherein the transceiver has a cellular communication circuit to use cellular communication as the wireless communications between the backend cloud-based system and the transceiver of the universal key fob simulator; and wherein the RF transmitter is configured to cooperate with the servers in the backend cloud-based system, where a set of one or more databases are configured to cooperate with the servers of the backend cloud-based system, where the databases store a set of different key protocols including their specific RF frequency for two or more current already existing protocols in a set of potential key fobs in the market, where in the set of potential key fobs in the market a first vehicle from a first vehicle manufacture has a different protocol than a second vehicle from a second vehicle manufacture, where the server is configured to select an appropriate protocol and its specific RF frequency from a set of databases based on referencing data stored in the system regarding the target vehicle and send the appropriate protocol and its specific RF frequency to the universal key fob simulator, where then the RF transmitter is configured to use the one or more ASICs to generate the first actuation command at a first stable RF frequency to the particular target vehicle.

5. The universal key fob simulator of claim 1, wherein the security module is configured to receive, via the transceiver, a set of two or more consecutive rolling security keys of the RKE module of the target vehicle from the servers of the backend cloud based system, where the set of two or more consecutive rolling security keys have a pre-defined order, wherein the security module is also configured to generate two or more actuation commands in response to pushing the buttons on the universal key fob simulator, where the security module is configured to send actuation commands with a distinct next consecutive rolling security key based on the pre-defined order to the RKE module of the target vehicle such that after authentication of each rolling security key, the corresponding actuation command is executed by the RKE module of the target vehicle; and thus, the RF transmitter sends the first actuation command with the first rolling security key and then sends a second actuation command with a second rolling security key, which is next in the consecutive rolling security key sequence.

6. The universal key fob simulator of claim 1, wherein the transceiver of the universal key fob simulator is configured to include a virtual key when communicating to the backend cloud-based system, where the virtual key is used by the backend cloud-based system to authenticate the communications.

7. The universal key fob simulator of claim 1, wherein the universal key fob simulator is configured to when used by a delivery person associated with the delivery vehicle i) to issue the first actuation command of electro-mechanically causing at least one of lights of the target vehicle to flash or otherwise turn on and a horn of the target vehicle to honk, and then i) to issue a second actuation command of electro-mechanically causing at least one of open a trunk or unlock a door of the target vehicle to perform either 1) a package exchange or 2) a vehicle maintenance service on the target vehicle; and wherein the universal key fob simulator is also configured to when used by the delivery person associated with the delivery vehicle to present a notification to remind the delivery person to close and lock the target vehicle after performing the package exchange or vehicle maintenance service.

8. The universal key fob simulator of claim 1, wherein the map locating signals received by the map-calculating circuit are Global Positioning System (GPS) signals, the map-calculating circuit is a Global Positioning System, and the map coordinates are GPS coordinates, where the mapping module is configured to send the GPS coordinates of the delivery vehicle, via the transceiver, to the servers of the backend cloud based system; and wherein a GPS-based proximity module in the backend cloud-based system is configured to use the GPS coordinates of the delivery vehicle and the already known GPS coordinates of the target vehicle to monitor a relative distance between the delivery vehicle and the target vehicle.

9. A method of accessing a target vehicle by a universal key fob simulator, the method comprising:

configuring a transceiver of the universal key fob simulator to wirelessly communicate with a backend cloud-based system;

receiving map locating signals by a map-calculating circuit of a mapping module of the universal key fob simulator;

calculating, by the map-calculating circuit and based on the mapping signals, map coordinates of a delivery vehicle associated with the universal key fob simulator;

storing the map coordinates of the delivery vehicle in one or more memory buffers of the universal key fob simulator;

sending the map coordinates of the delivery vehicle, via the transceiver, to servers of the backend cloud based system, wherein the backend cloud based system is configured to use the map coordinates to monitor a location of the delivery vehicle;

receiving, by a security module of the universal key fob simulator, a rolling security key of an RKE module of the target vehicle, via the transceiver, from the servers of the backend cloud based system after the delivery vehicle reaching a pre-determined location between a geographical location of the delivery vehicle relative to a geographic location of the target vehicle, where a Radio Frequency transmitter has one or more Application Specific Integrated Circuits to be highly configurable in generating a set of two or more stable RF signals at different frequency wavelengths in order to transmit the RF signals of a command to the RKE module;

activating one or more buttons of the universal key fob simulator after receiving at least one rolling security key of the RKE module of the target vehicle;

generating a first actuation command for an electro mechanical operation in the target vehicle, by the security module of the universal key fob simulator, in response to pushing a button of the universal key fob simulator by a user of the universal key fob simulator;

sending the first actuation command and the rolling security key of the target vehicle to a RF transmitter of the universal key fob simulator;

transmitting, by the RF transmitter, at an RF frequency of the target vehicle, the RF signals including the first actuation command and the rolling security key to the RKE module of the target vehicle; and executing the first actuation command to cause the electro mechanical operation in the target vehicle, by the RKE module of the target vehicle, upon validating the rolling security key.

10. The method of claim 9, further including:

generating a valid rolling security key of the RKE module of the target vehicle by the key fob simulator through:

receiving a first algorithm and a first data from the servers of the backend cloud-based system, and implementing the first algorithm and using the first data to determine the rolling security key.

11. The method of claim 9, wherein receiving the rolling security key after establishing a close proximity by a threshold distance between the package delivery vehicle and the target vehicle such that actuation commands are executed after establishing the close proximity.

12. The method of claim 9, wherein cellular communication is used between the backend cloud-based system and the transceiver of the universal key fob simulator;

wherein the map locating signals received by the map-calculating circuit are Global Positioning System (GPS) signals, and the map coordinates are GPS coordinates, where the mapping module is configured to send the GPS coordinates of the delivery vehicle to the servers of the backend cloud based system.

13. The method of claim 9, wherein receiving two or more consecutive rolling security keys of the RKE module of the target vehicle from the servers of the backend cloud based system, where the two or more consecutive rolling security keys have a pre-defined order;

wherein generating two or more actuation commands by pushing two or more buttons of the universal key fob simulator; and sending each actuation command with a distinct next consecutive rolling security key based on the pre-defined order to the RKE module of the target vehicle.

14. The method of claim 9, wherein including a virtual key when communicating to the backend cloud-based system, where the virtual key is used by the backend cloud-based system to authenticate the communications.

15. The method of claim 9, further including using the universal key fob simulator by a delivery person associated with the delivery vehicle i) to issue a first actuation command of electro-mechanically causing at least one of lights of the target vehicle to flash or otherwise turn on and a horn of the target vehicle to honk, and then i) to issue a second actuation command of electro-mechanically causing at least one of open a trunk or unlock a door of the target vehicle to perform either 1) a package exchange or 2) a vehicle maintenance service on the target vehicle; and using the universal key fob simulator by the delivery person associated with the delivery vehicle to lock the target vehicle after performing the package exchange or vehicle maintenance service.

* * * * *